United States Patent [19]

Torii et al.

[11] Patent Number: 4,956,839
[45] Date of Patent: Sep. 11, 1990

[54] ATM SWITCHING SYSTEM

[75] Inventors: Yutaka Torii; Makoto Mori; Shinobu Gohara, all of Yokohama; Kenichi Ohtsuki, Kanagawa; Yoshito Sakurai, Yokohama, all of Japan

[73] Assignee: Hitachi, Ltd., Tokyo, Japan

[21] Appl. No.: 382,419

[22] Filed: Jul. 20, 1989

[30] Foreign Application Priority Data

Jul. 22, 1988 [JP] Japan .............................. 63-181885
Sep. 28, 1988 [JP] Japan .............................. 63-241098

[51] Int. Cl.$^5$ ............................................. H04Q 11/04
[52] U.S. Cl. ..................................... 370/60; 370/94.1
[58] Field of Search ................. 370/60, 94.1, 94.2, 370/58.1, 58.2, 100.1, 110.1; 329/88, 196, 211

[56] References Cited

U.S. PATENT DOCUMENTS

| | | | |
|---|---|---|---|
| 4,339,815 | 7/1982 | Herledan et al. | 370/58.1 |
| 4,466,095 | 8/1984 | Kawano et al. | 370/58.1 |
| 4,670,871 | 6/1987 | Vaidya | 370/60 |
| 4,782,478 | 11/1988 | Day, Jr. et al. | 370/60 |
| 4,799,215 | 1/1989 | Suzuki | 370/60 |
| 4,813,037 | 3/1989 | Debuysscher et al. | 370/60 |

*Primary Examiner*—Douglas W. Olms
*Assistant Examiner*—Alpus H. Hsu

*Attorney, Agent, or Firm*—Antonelli, Terry, Stout & Kraus

[57] ABSTRACT

In the ATM switching system, an ATM speech path is divided into a plurality of functional blocks. A routing function for distributing cells (packets) each of a fixed length to addresses outgoing lines and a logical multiplexing function are imparted to a switch, while other functions associated with a line typified by a phase synchronizing function and a flow control function are incorporated en bloc in ATM line terminating units and functions capable of being processed by hardware in common to the lines are assembled in a line common unit. The ATM line terminating unit physically terminates transmission lines and performs the processing relevant to header information of the cells each of a fixed length (ATM terminating processing) and includes a cell phase synchronizing circuit for matching the temporal positions of the cells among the lines and a flow control circuit for avoiding overload exceeding the load declared by subscriber terminal. The line common unit serves for processings of call control signals and the calls and includes a signal processing circuit and a control circuit. The switch performs cell multiplexing and switching and is constituted by a self-routing switch.

18 Claims, 22 Drawing Sheets

F I G. 3
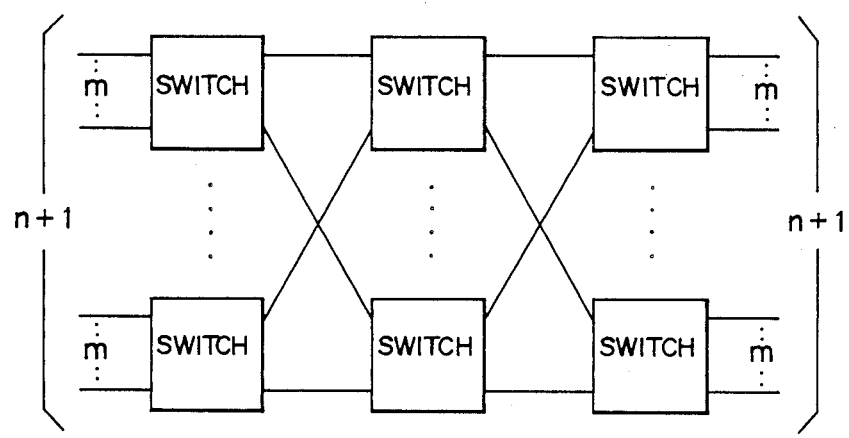

F I G. 15

| INPUT CALL IDENTIFIER NO. | OUTPUT CALL IDENTIFIER NO. | DECLARED VALUE | CELL COUNT VALUE | TIMER VALUE | NUMBER OF ILLEGAL CELLS |
|---|---|---|---|---|---|
| 0 | | | | | |
| 1 | | | | | |
| 2 | | | | | |
| 3 | | | | | |
| ≈ | ≈ | ≈ | ≈ | ≈ | ≈ |
| 65.535 | | | | | |

F I G. 27
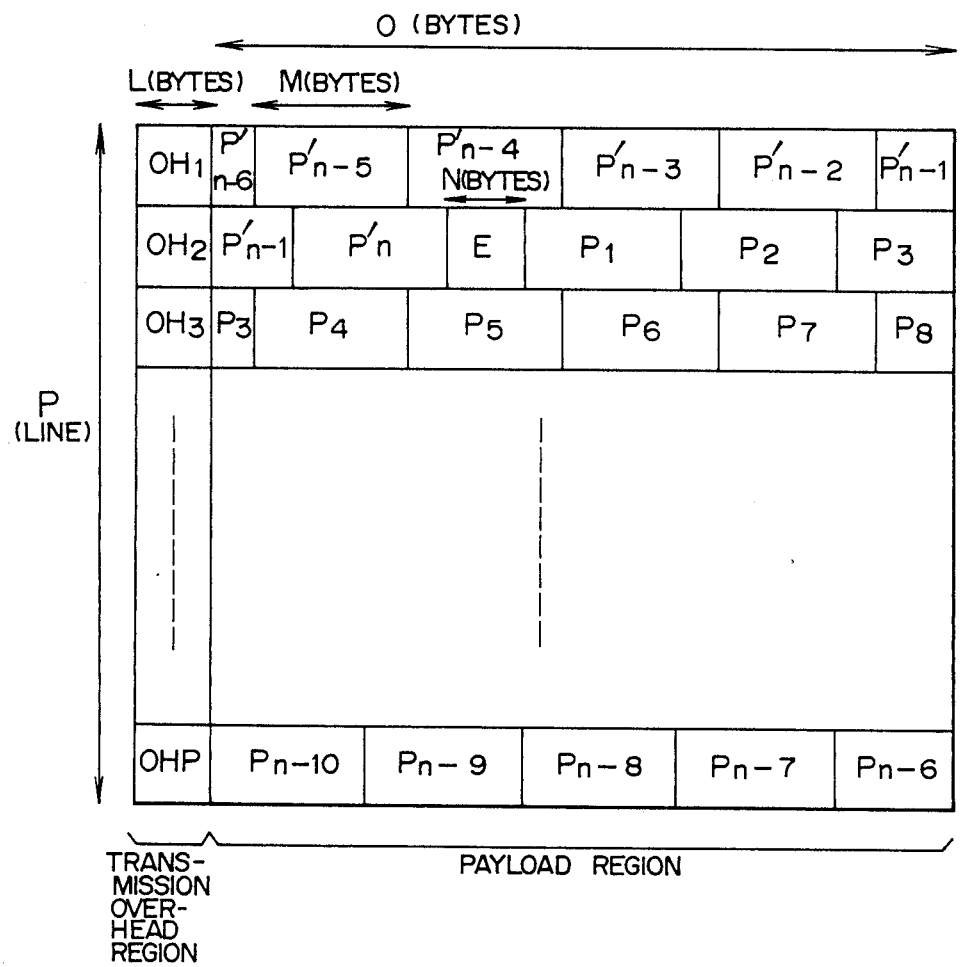

ATM SWITCHING SYSTEM

BACKGROUND OF THE INVENTION

The present invention generally relates to a structure of a speech path for a switching system. More particularly, the invention is concerned with a speech path structure which is profitably suited for the speech path system of a so-called ATM (Asynchronous Transfer Mode) switching system adapted for switching or exchanging information for communication on a time-division/multiplex basis by using packets each of a fixed length.

As a typical one of the speech paths used heretofore for the switching systems, there can be mentioned a digital time division speech path which is suited for a line switching system and which is composed of a speech path memory, a control memory and a space division switch.

The switch is equipped with a controller for writing switching information in the control memory, wherein time divided and multiplexed information makes access to the control memory at every multiplexed unit (time slot) to derive information concerning the destination or addresses to which the information is to be sent, whereon the connection is established through the switch in accordance with the information as read out.

Although the time division speech path system is suited for the line or call switching, it can not always be said that this system is suited for communications of different rates for which demand is expected to increase in the future. Further, the digital time division speech path is not necessarily suited as multi-media having a variety of properties. On the other hand, a packet switching system which seems capable of coping with more flexibly the requirements mentioned above encounters difficulty in application to the communications of different rates and among others a high-speed broad band communication at the present state of the art.

Under the circumstances, study and development of the ATM (Asynchronous Transfer Mode) system are in progress as a novel switching system. The ATM system is characterized in that all information inclusive of communication information, call processing information and others is handled in terms of packets referred to as the cells as the unit of information to be processed. In realizing the ATM switching system, it is of course important to solve a problem in what structure the speech path is to be realized for practical applications. So far as the switch function is concerned, several proposals have already been made. However, there remain unsolved problems concerning other functions required for the ATM speech path system such as, for example, cell phase synchronizing function, label conversion, cell flow control and other functions. In other words, it is a matter of primary concern to solve the problem how to implement the abovementioned functions in order to structurize a realistic speech path system.

Reference is hereby made to the following copending applications dealing with related subject matter and assigned to the assignee of the present application: 1. "Time-Division Channel Arrangement" by Yoshito Sakurai et al, assigned U.S. Ser. No. 96,011, and 2. "Switching System And Method Of Construction Thereof" by Yoshito Sakurai et al, assigned U.S. Ser. No. 218,217.

Further, as the related arts, the following patents may be mentioned:
U.S.P. 4,594,708
U.S.P. 4,603,416
U.S.P. 4,782,478
U.S.P. 4,813,037

SUMMARY OF THE INVENTION

An object of the present invention is to provide a speech path structure which can solve the problems of the prior art mentioned above and which allows an ATM switching system to be realized efficiently and economically.

Another object of the invention is to provide an ATM line terminating apparatus as a constituent element of the ATM switching system which is capable of performing the functions required in association with individual lines or circuits (such as, for example, phase synchronization and flow control functions) with high efficiency.

A further object of the present invention is to decrease the capacity of a memory used for phase synchronization in a cell phase synchronizing circuit incorporated in an ATM line terminating apparatus while reducing a delay involved by the phase synchronization.

A still further object of the present invention is to provide a flow monitor circuit which is incorporated in the ATM line terminating apparatus and which is capable of measuring the flow of cells with a high accuracy.

In view of above and other objects which will be more apparent as description proceeds, it is proposed according to a general aspect to divide the ATM speech path system into a plurality of function blocks. They are a fixed-length packet (cell) routing function (i.e. function for distributing packets or cells each of a fixed length to outgoing lines leading to respective destinations) and a logical multiplexing function imparted to the switch, functions required separately for individual lines (e.g. phase synchronizing function and flow control function) imparted en bloc to the ATM line terminating apparatus and those functions which can be processed by shared hardware provided in common to the lines and which are thus assembled and implemented in a unit common to the lines.

In conjunction with the division or classification of the functions mentioned above, it is analyzed where a given one of these functions is located in a processing hierarchy (protocol layers) to thereby establish definite correspondence and match between the classified functions and the hierarchical structure and delimit distinctively the functions so that independency thereof can be enhanced, while interconnections among the individual function blocks are simplified to facilitate the realization of the system.

The ATM line terminating apparatus serves to physically terminate the transmission line and performs the processing (ATM terminating processing) of information contained in a header field of the packet of a fixed length (hereinafter referred to as the cell). To this end, the ATM line terminating apparatus includes a cell phase synchronizing circuit for matching the temporal positions of cells in each of the lines and a flow monitor circuit for performing control to avoid overload which exceeds the load declared by a subscriber terminal.

The unit common to the lines serves for processings of call control signals as well as calls and is composed of a signal processing circuit and a control circuit.

The switch performs multiplexing and switching (exchange) of the cells and may be constituted by a self-routing switch.

In the ATM line terminating apparatus, the cell phase synchronizing circuit is so arranged as to be capable of operation with a plurality of frequencies and implement both the phase synchronizing function and the cell rate converting function. Further, in the ATM line terminating apparatus, the flow monitor circuit is so arranged that the control information for the flow control can be stored in a cell header conversion table (label conversion table).

BRIEF DESCRIPTION OF THE DRAWINGS

In the course of the following description, reference is made to the accompanying drawings, in which:

FIG. 3 is a diagram showing schematically a structure of a self-routing switch shown in FIG. 1;

FIG. 15 is a view for illustrating a structure of an information table shown in FIG. 4 according to an embodiment of the invention;

FIG. 27 is a view for illustrating another example of the input signal to the cell phase synchronizing circuit shown in FIG. 24.

DESCRIPTION OF THE PREFERRED EMBODIMENT

Now, the present invention will be described in detail in conjunction with preferred or exemplary embodiments thereof by reference to the drawings.

Figure 1:
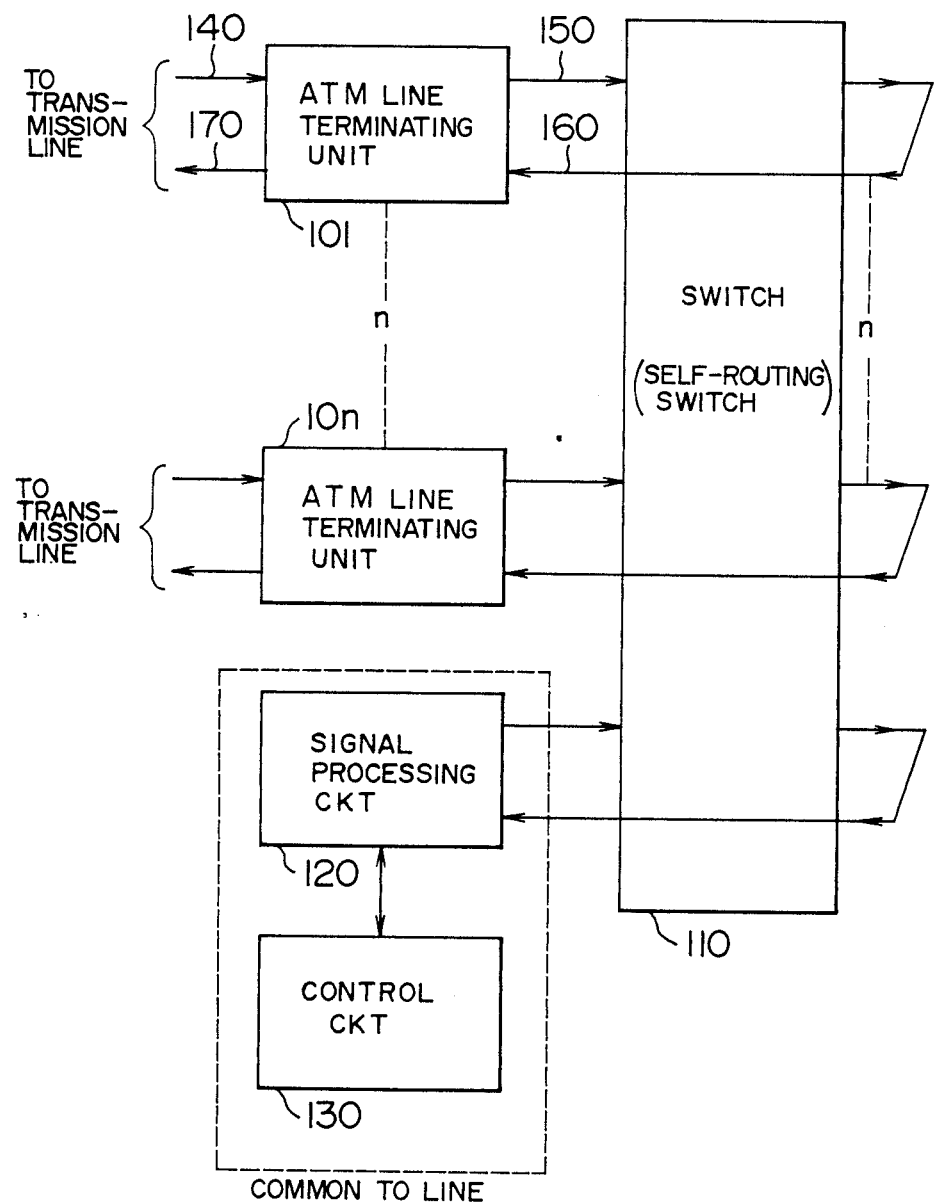
FIG. 1 is a schematic block diagram showing a speech path system according to an exemplary embodiment of the present invention.

FIG. 1 shows a speech path system according to an embodiment of the present invention. In general, the speech path system is composed of n ATM line terminating apparatus or units 101 to 10n, a switch 110, a signal processing circuit 120 and a control circuit 130.

The ATM line terminating units 101 to 10n are provided in association with individual lines, respectively. The switch 110 includes a plurality of incoming lines (n+1 lines in the case of the system shown in FIG. 1) and a plurality of outgoing lines (also n+1 lines). Each of the incoming lines is connected to the associated one of the ATM line terminating units. Similarly, the outgoing lines are connected to the associated ATM line terminating units, respectively. In this conjunction, it should further be noted that at least one of the incoming lines and at least one of the outgoing lines are connected to the signal processing circuit 120 as well. The signal processing circuit 120 and the control circuit 130 are connected to each other.

Each of the ATM line terminating apparatus or units (e.g. 101) serves as an interface between a transmission line 140 and the incoming line 150 on one hand and between the outgoing line 160 and a transmission line 170 on the other hand. As the major functions of the ATM line terminating apparatus, there can be mentioned a transmission line terminating function, a cell phase synchronization, a cell flow control and a label converting function, as will be described in more detail later on.

Figure 2A:
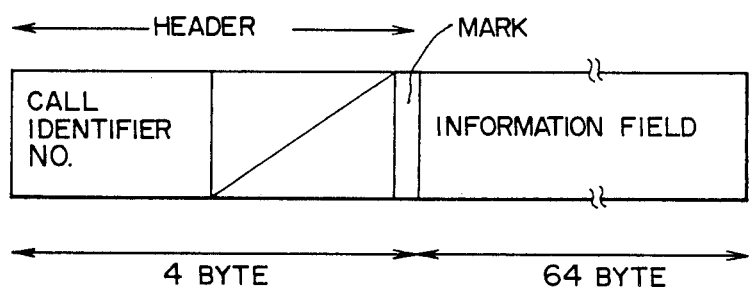
FIGS. 2(a) and 2(b) are views showing signal formats for communication information on an incoming line (150) and an outgoing line (160) shown in FIG. 1 and thus an input signal and an output signal of a cell phase synchronizing circuit shown in FIG. 4.
Figure 2B:
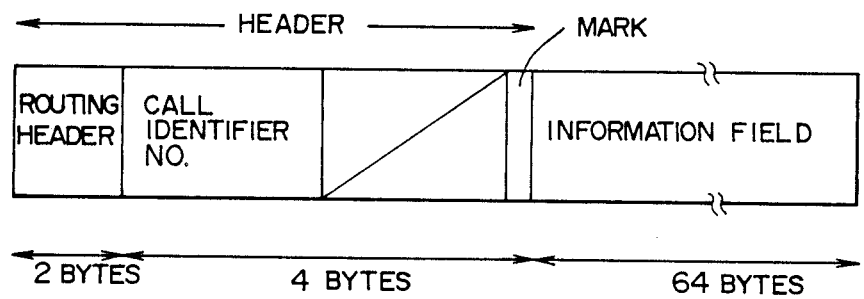

The switch 110 serves for switching or transferring the information for communication from a given one of the incoming lines to a given one of the outgoing lines. On the incoming line 150 as well as the outgoing line 160, the information for communication is handled in terms of packets referred to as cells each having a fixed length and a structure illustrated in FIG. 2(a) or 2(b). The switch 110 is implemented as a so-called self-routing switch operating as a hardware logic unit in response to a virtual line number VCN which is the call identification number or in response to information contained in a routing header. The self-routing switch 110 serves for the self-routing and logical multiplexing functions.

As the typical structure of the self-routing switch, there can be mentioned the switch realized by using a banyan network or a memory switch. By way of example, the switch disclosed in U.S. Patent Application Ser. No. 218,217 cited hereinbefore can be applied to this end.

When a great number of the line (lines) are to be accommodated, the switch 110 may be implemented in such a multi-stage configuration as shown in FIG. 3. Basically, the switch 110 may be of any structure so long as the cells inputted from any given incoming line can be outputted on any given outgoing line.

The signal processing circuit 120 serves for processing signaling cells carrying call processing signals among those cells transferred from the transmission line. As the major functions of the signal processing circuit 120, there can be mentioned disassembling and assembling of the signaling cells, a signal rate matching, an error control and a flow control.

The control circuit 130 mainly serves for call processing function. The function of this control unit 130 is basically similar to that of the switching system known heretofore.

The signal processing circuit 120 and the control circuit 130 can be realized by appropriate combinations of control processor, logical circuits and other in the manner known per se without requiring any especial techniques for the implementation.

As will be apparent from the above, the speech path system according to the illustrated embodiment of the invention is constituted in general by four major function blocks. The following description is directed to the details of the ATM line terminating unit or apparatus which constitutes the function block characterizing one of the most important aspects of the present invention.

Figure 4:
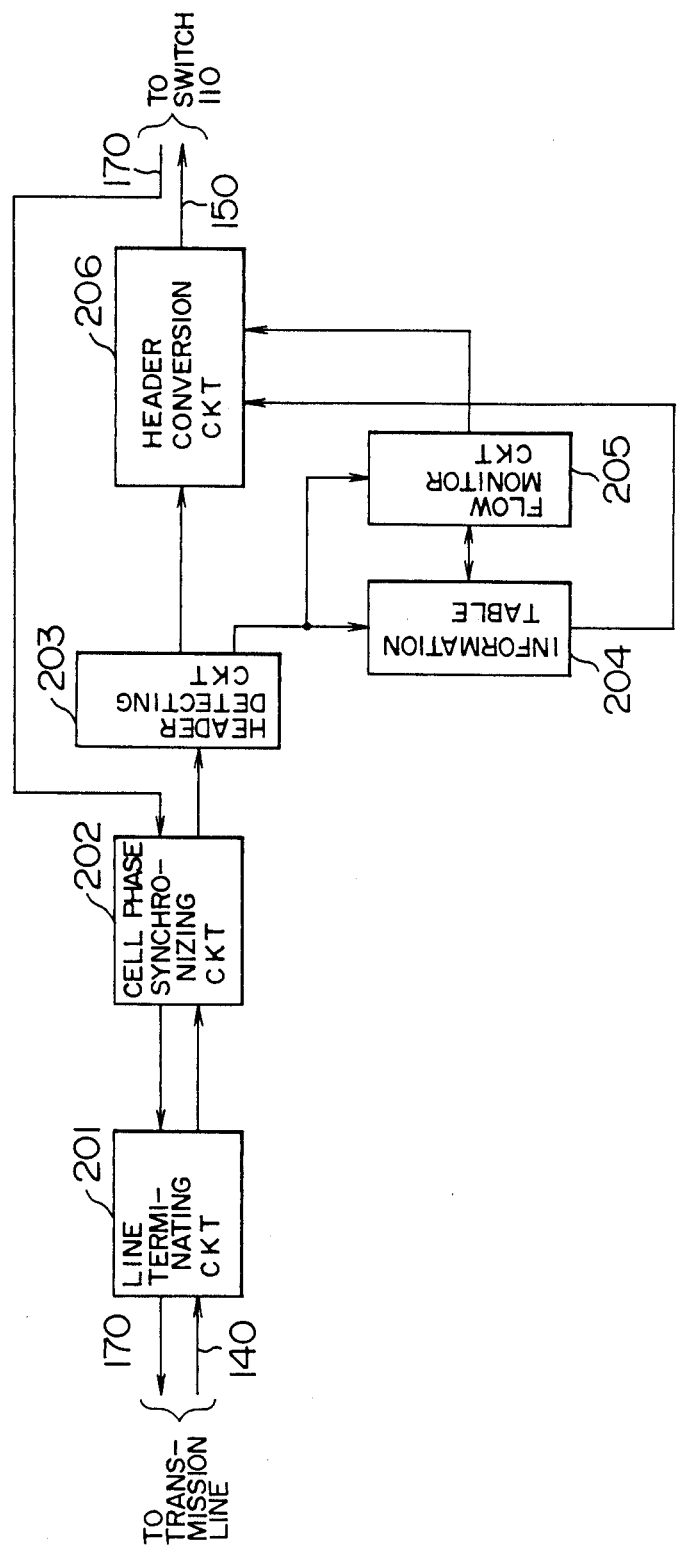
FIG. 4 is a block diagram showing a general arrangement of an ATM line terminating apparatus or unit shown in FIG. 1 according to an exemplary embodiment of the present invention.

FIG. 4 is a block diagram showing a general arrangement of the ATM line terminating apparatus according to an exemplary embodiment of the present invention. In FIG. 4, a reference numeral 201 denotes a line terminating circuit for realizing physical interface between the transmission line and the switch 110. A numeral 202 designates a cell phase synchronizing circuit for carrying out phase matching on a cell basis for the cells inputted with different phases to the individual lines. A numeral 203 denotes a header detecting circuit for detecting the header of the inputted cell which contains the switching control information. A numeral 204 denotes an information table for storing en bloc the switching control information and the flow control information for each of the call identifier numbers (virtual line numbers). A numeral 205 denotes a flow monitor circuit for measuring the flow of the input cells for each call identifier number to thereby monitor whether or not the flow exceeds a preset reference value, as will be described in more detail hereinafter. Finally, a numeral 206 denotes a header conversion circuit for rewriting the header of the cell on the basis of the information contained in the information table 204 and the information supplied from the flow monitor circuit 205.

Operation of the ATM line terminating apparatus will now be described. The signal from the transmission line is inputted to the line terminating circuit 201 to undergo physical termination processings such as clock extraction, frame detection, bit phase synchronization and others and then supplied to the cell phase synchronizing circuit 202 in the form of a stream of information. In the cell phase synchronizing circuit 202, phases of the cells inputted with phases differing from one to another line are detected, whereon the phase synchronization is established on a cell basis. The phase synchronized cell is then supplied to the header detecting circuit 203 where the header information is read out.

The header information is then inputted to the information table 204. On the basis of the call identification number (virtual line number or VCN), the relevant switch information and flow control information are derived to be subsequently inputted to the flow monitor circuit 205 and the header conversion circuit 206. The flow monitor circuit 205 measures by counting the input cells for each of the call identifier numbers. When the flow of the cells exceeds a predetermined value, information of the flow excess is messaged to the header conversion circuit 206 which responds thereto by carrying out en bloc the header conversion processings such as the rewriting of the call identifier numbers, display of the cells of the excess flow and others.

In the following, the individual parts or components constituting the ATM terminating apparatus outlined above will be described in detail in conjunction with exemplary embodiments thereof.

Figure 5:
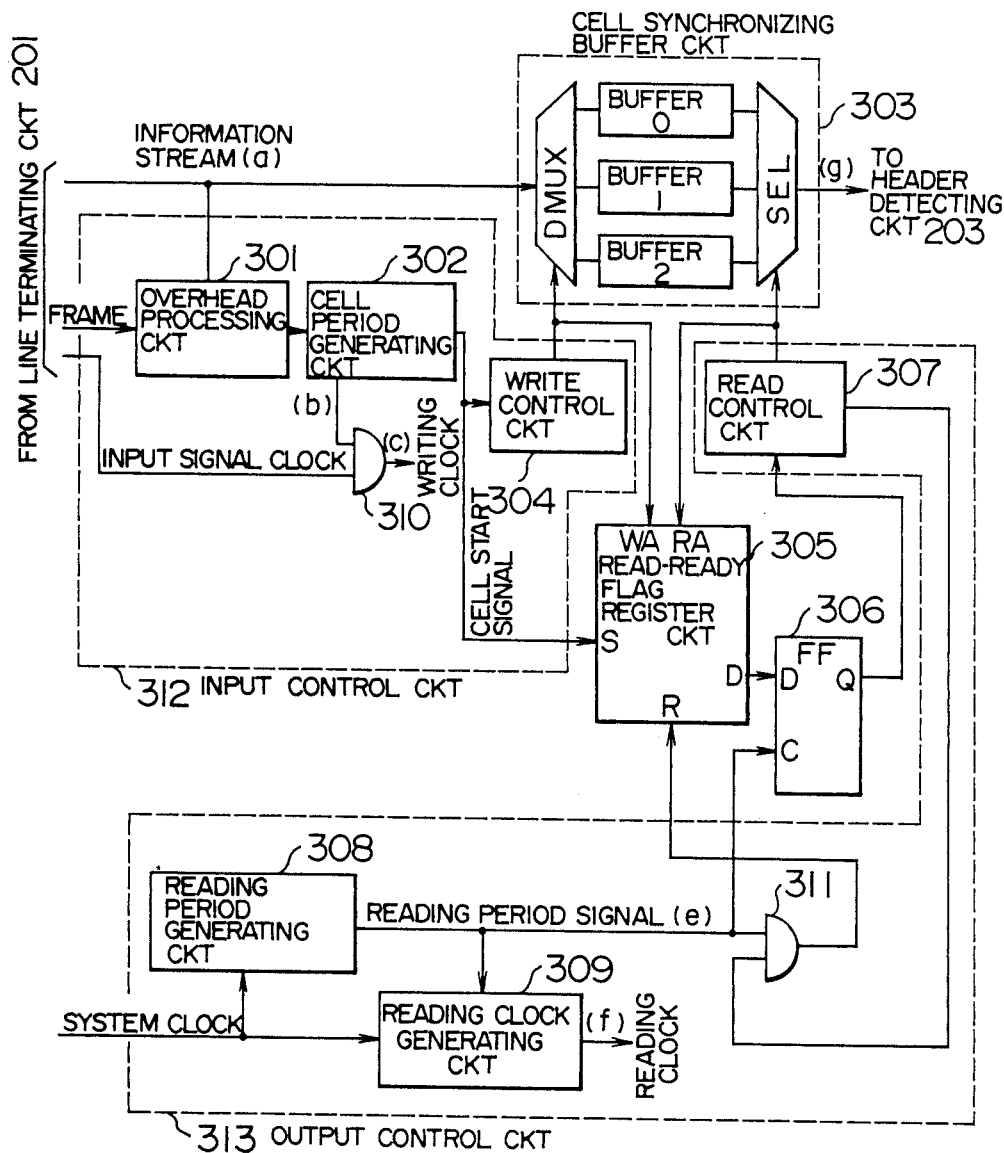
FIG. 5 is a block diagram showing a circuit configuration of a cell phase synchronizing circuit shown in FIG. 4 according to an embodiment of the invention.

FIG. 5 is a block diagram showing a circuit configuration of a portion of the cell phase synchronizing circuit 202 for sending out the information to be transmitted to the header detecting circuit 203 from the line terminating circuit 201, as described above by reference to FIG. 4. In FIG. 5, a reference numeral 312 denotes an input control circuit and 313 denotes an output control circuit. Further, a numeral 301 denotes an overhead processing circuit for detecting the boundary of the cells in the information bit stream by making use of an overhead carrying the transmission control information, 302 denotes a cell period generating circuit for generating as the outputs thereof a cell start signal indicating the start of the cells and a write clock control signal corresponding to the cell arrival time on the basis of the information available from the output of the overhead processing circuit 301. Further, a numeral 303 denotes a cell synchronizing buffer circuit which is composed of three buffers each having a capacity capable of storing one cell, a demultiplexer (DMUX) for distributing the input signals to the three buffers and a selector (SEL) for selecting the output from one of the three buffers. A numeral 304 denotes a write control circuit for changing over sequentially the writing buffers every time one cell is written in the buffer on the basis of the cell start signal supplied from the cell synchronizing signal 202. A numeral 305 denotes a read-ready flag register circuit including registers each provided in association with each of the buffers for storing, respectively, the states written in the three buffers incorporated in the cell synchronizing buffer circuit 303. A numeral 306 denotes a flip-flop for latching the output of the read-ready flag register circuit 305. A numeral 307 denotes a read control circuit for determining and correspondingly changing over the buffer to be read out on the basis of the value latched by the flip-flop 306. A numeral 308 denotes a reading period generating circuit for generating a reading period signal indicating the periodical interval at which the cells are to be read out from the three buffers incorporated in the cell synchronizing buffer circuit 303. A numeral 309 denotes a buffer reading clock generating circuit for generating a clock for the buffer reading on the basis of a system clock and the output of the reading period generating circuit 308. A numeral 310 denotes a writing clock generating circuit for generating a writing clock signal on the basis of an input signal clock. Finally, a numeral 311 denotes an AND gate for controlling a reset signal for the read-ready flag register circuit 305. Now, the description will be turned to the operation of the circuit having the structure described above. At this juncture, it should first be mentioned that the frequency of the reading clock signal differs from that of the writing clock signal by a frequency corresponding to a difference between the bit rates required for transmitting, respectively, the overhead mentioned hereinbefore and a routing header described hereinafter.

Figure 7:
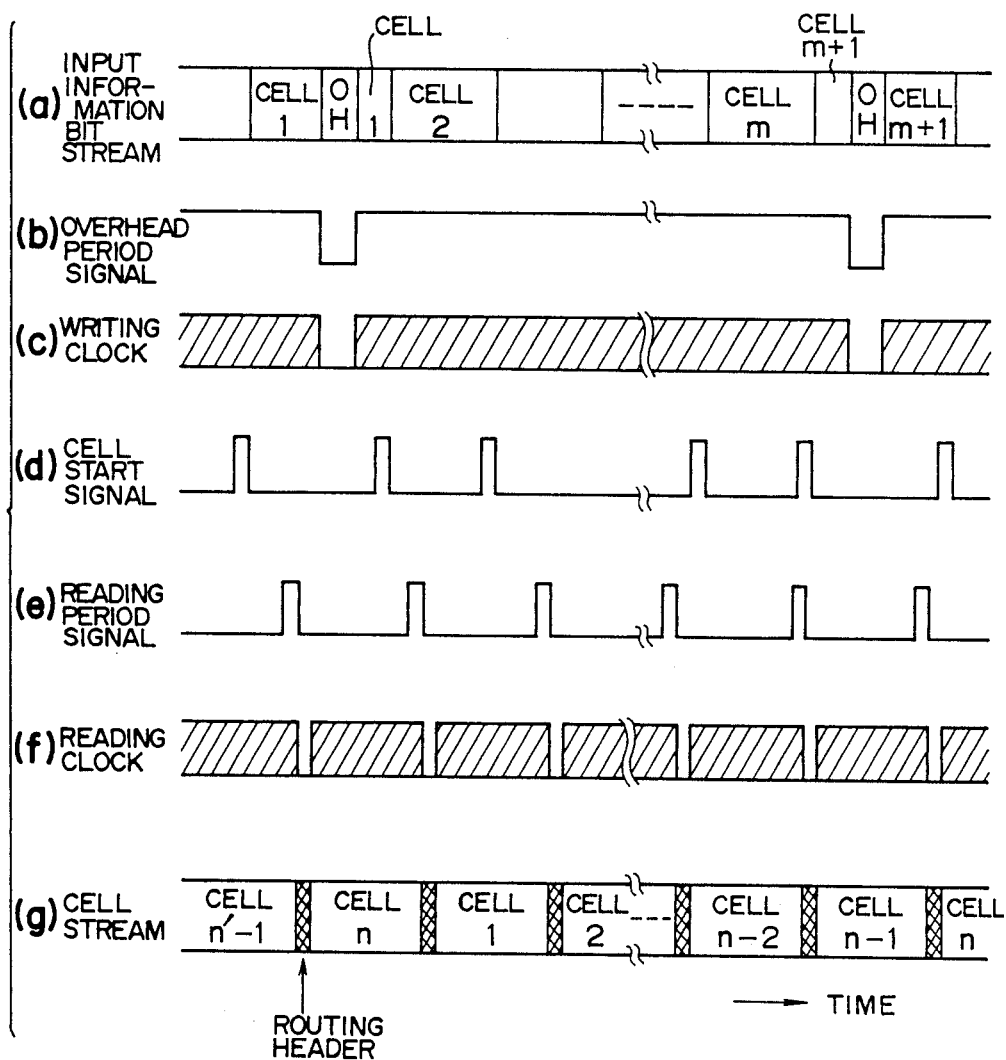
FIG. 7 is a time chart for illustrating operation of the cell phase synchronizing circuit shown in FIG. 5.
Figure 8:
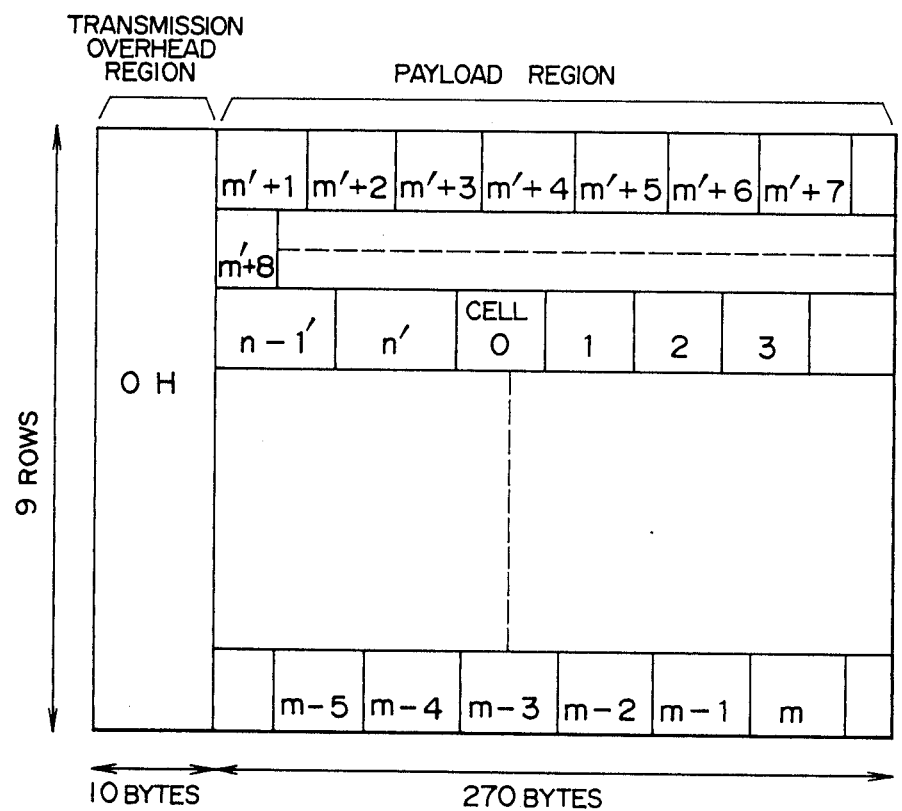
FIG. 8 is a view for illustrating a structure of the input signal to the cell phase synchronizing circuit.

The signal inputted to the circuit shown in FIG. 5 includes the cells disposed within a frame structure delimited by the overheads inserted periodically, as can be seen from the format of the input information stream shown at (a) in FIG. 7 which is a time chart showing various signals mentioned above. As is shown in FIG. 7 at (a), there may occur discontinuation or division of a cell due to the presence of the overhead. For more particulars, reference may have to be made to FIG. 8 which shows the structure of one frame. As can be seen in this figure, one frame is constituted by the overhead region of 10 bytes and cell regions each of 270 bytes and each located between the adjacent overhead regions and in which the cells are disposed, wherein the frame length corresponds to 9 periods or rows of the overhead regions and the cell regions. (In this conjunction, it should be appreciated that the byte numbers mentioned above are by way of example only and that the invention is never restricted to such numbers of the bytes.) On the other hand, information concerning positional relations between the frame and the individual cells are contained in the overhead region as pointer information. Thus, the overhead processing circuit 301 can detect the positional relations between the cells and the frame by checking the pointer information. The information concerning the positional relations is sent to the cell period generating circuit 302. In response to the information outputted from the overhead processing circuit 301, the cell period generating circuit 302 generates the cell start signal shown in FIG. 7 at (d) and indicating the periodical interval at which the cells are generated and the overhead period signal shown in FIG. 7 at (b) and indicating the overhead period for controlling the write clock. The overhead period signal controls the AND gate 310 such that the write clock is outputted over a period during which the cells are inputted, as shown in FIG. 7 at (c). On the other hand, the write control circuit 304 responds to the cell start signal outputted from the cell period generating circuit 302 for thereby changing over the write buffers sequentially. The cell synchronizing buffer circuit 303 loads only the contents of the cells included in the information bit stream in the buffers under the timing of the write clock on a cell-by-cell basis. Upon every completion of the cell writing operation, the associated read-ready flag register 305 is set.

When the cell is to be read out from the cell synchronizing buffer circuit 303, the value of the read-ready register 305 is latched by the flip-flop 306 under the timing of the reading period signal (see FIG. 7 at (e)) supplied from the reading period generating circuit 308 and inputted to the read control circuit 307 for determining the buffer whose content is to be read out. By sending the information representing the buffer thus determined to the cell synchronizing buffer circuit 303 under the cell send-out timing, the buffer reading operation is enabled.

Parenthetically, the reading clock generating circuit 309 is arranged such that the reading clock (see FIG. 7 at (f)) is interrupted for the first two bytes of each cell to thereby assure for each cell the region of the routing header containing the switching control information for the switch.

In case the buffer for which the cell writing operation has been completed is absent in the cell synchronizing buffer circuit 303 upon read-out operation, the read-out control circuit 307 then controls the cell synchronizing buffer circuit 303 such that a blank (empty) area having the same length as that of the cell is sent out by the cell synchronizing buffer circuit 303 while the AND gate 311 is so controlled as to inhibit the read-ready flag register 305 from being reset.

Next, operation of the circuit shown in FIG. 5 will be described by reference to the timing chart shown in FIG. 7. Upon arrival of the overhead contained in the input information bit stream (see FIG. 7 at (a)), the cell period generating circuit 302 outputs an overhead period signal (see FIG. 7 at (b)), in response to which the writing clock (FIG. 7 at (c)) is stopped by the AND gate 310. In this way, the write control circuit 304 allows only the cells contained in the input information bit stream to be selectively written in the cell synchronizing buffer circuit 303. Further, the cell start signal (FIG. 7 at (d)) is outputted from the cell period generating circuit 302 immediately before the boundary of the cell region, as the result of which the demultiplexer or DMUX of the cell synchronizing buffer circuit 303 is changed over by the write control circuit 304 At the same time, the buffer for which the writing operation has been completed is stored by setting the associated register of the read-ready flag register circuit 305. Subsequently, in response to the rise-up edge of the reading period signal (FIG. 7 at (e)) outputted from the reading period generating circuit 308, the output of the read-ready flag register circuit 305 is latched by the flip-flop 306. In response to the falling edge of the reading period signal, the read control circuit 307 selects the buffer to be next read out to thereby change over correspondingly the selector incorporated in the cell synchronizing buffer circuit 303. At the same time, the register of the read-ready flag register circuit 305 which corresponds to the buffer to be next read out is reset. During a period taken for sending out two bytes starting from the time point of the change-over of the buffer to be read out, no reading clock is outputted from the reading clock generating circuit 309 (see FIG. 7 at (f)), whereby the routing header region is defined over this period. In succession to the routing header region, a row of bits each corresponding to one cell is successively read out from the buffer selected to be read out.

The cell synchronizing circuit according to the instant embodiment (shown in FIG. 5) thus serves for effectuating the synchronization of the cells on each line and at the same time for removing the overhead region from the input information bit stream while assuring the routing header region simultaneously.

Figure 6:
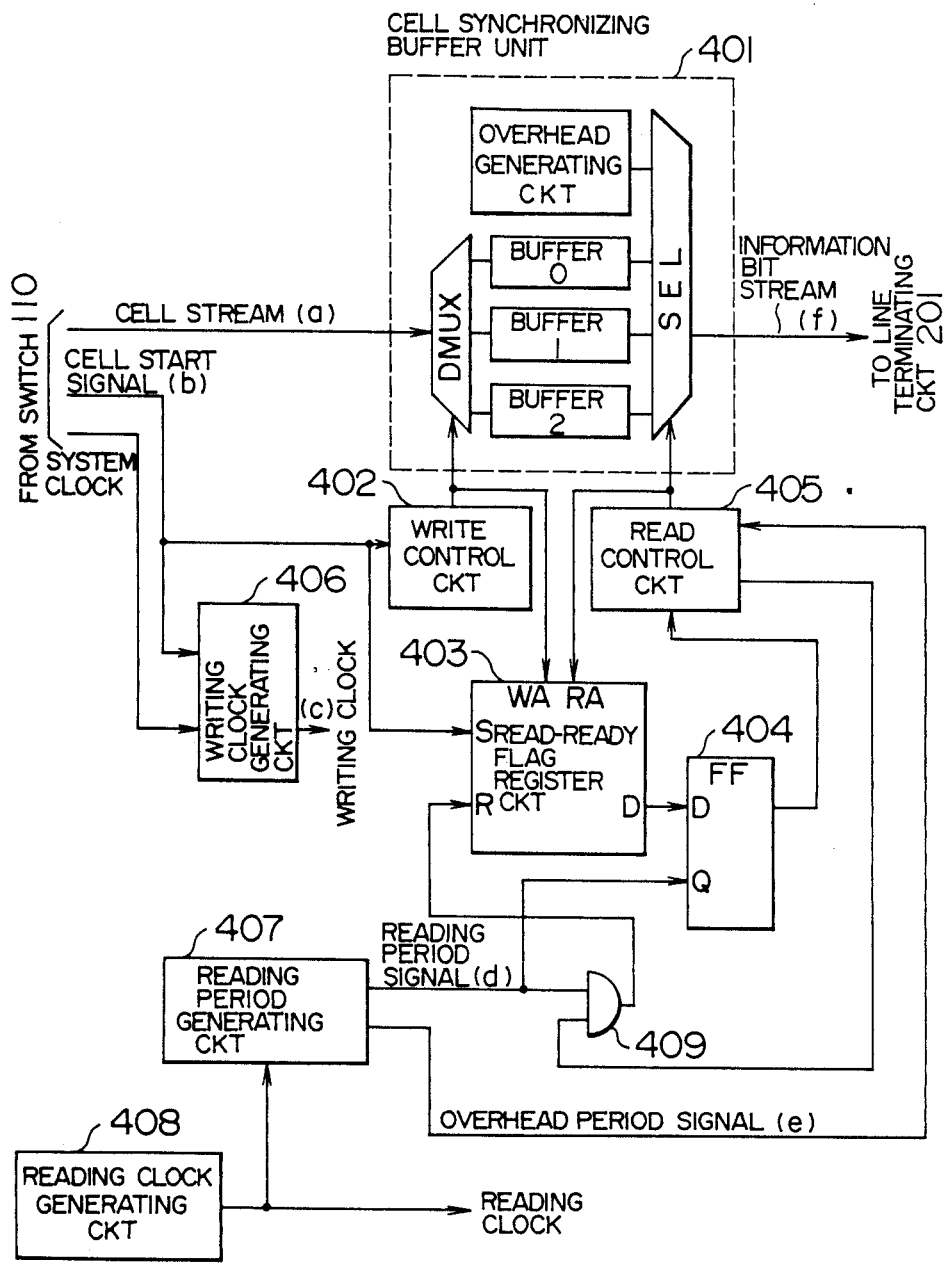
FIG. 6 is a block diagram showing another embodiment of the cell phase synchronizing circuit shown in FIG. 4 according to the invention.

FIG. 6 shows in a block diagram an exemplary circuit configuration of a portion of the cell phase synchronizing circuit 202 shown in FIG. 2 which portion is adapted to send out the information for transmission (i.e. information to be transmitted) to the line terminating circuit 201 from the switch 110. In FIG. 6, a reference numeral 401 denotes a cell synchronizing buffer circuit constituted by three buffers each capable of storing one cell, a demultiplexer (DMUX) for distributing the cells from the switch 110 to the individual buffers and a selector circuit (SEL) for selecting the output of the three buffers mentioned above and that of the overhead generating circuit. A numeral 402 denotes a write control circuit for changing over the buffers to be loaded in response to the cell start signal supplied from the switch 110. A numeral 403 denotes a read-ready flag register circuit including registers provided in correspondence to the three buffers, respectively, of the cell synchronizing buffer circuit 401, wherein each register is set upon completion of the writing operation while being reset in response to the reading operation. A numeral 404 denotes a flip-flop for latching the output of the read-ready flag register circuit 403. A numeral 405 denotes a read control circuit for determining the buffer to be read out on the basis of the value latched by the flip-flop 404 and changing over the output to the overhead generating circuit incorporated in the cell synchronizing buffer circuit 401 during the overhead period. A numeral 406 denotes a writing clock generating circuit. A numeral 407 denotes a reading period generating circuit for generating an output cell reading period signal and an overhead period signal indicating the overhead region to be outputted. A numeral 408 denotes a buffer reading clock generating circuit for outputting a reading clock consequtively except for the period corresponding to the routing header region allocated to the cell. Finally, a numeral 409 denotes an AND gate for inhibiting the read-ready flag register circuit 403 from being reset in response to the output of the read control circuit 405, unless there exist the buffers for which writing operation has been completed.

Figure 9:
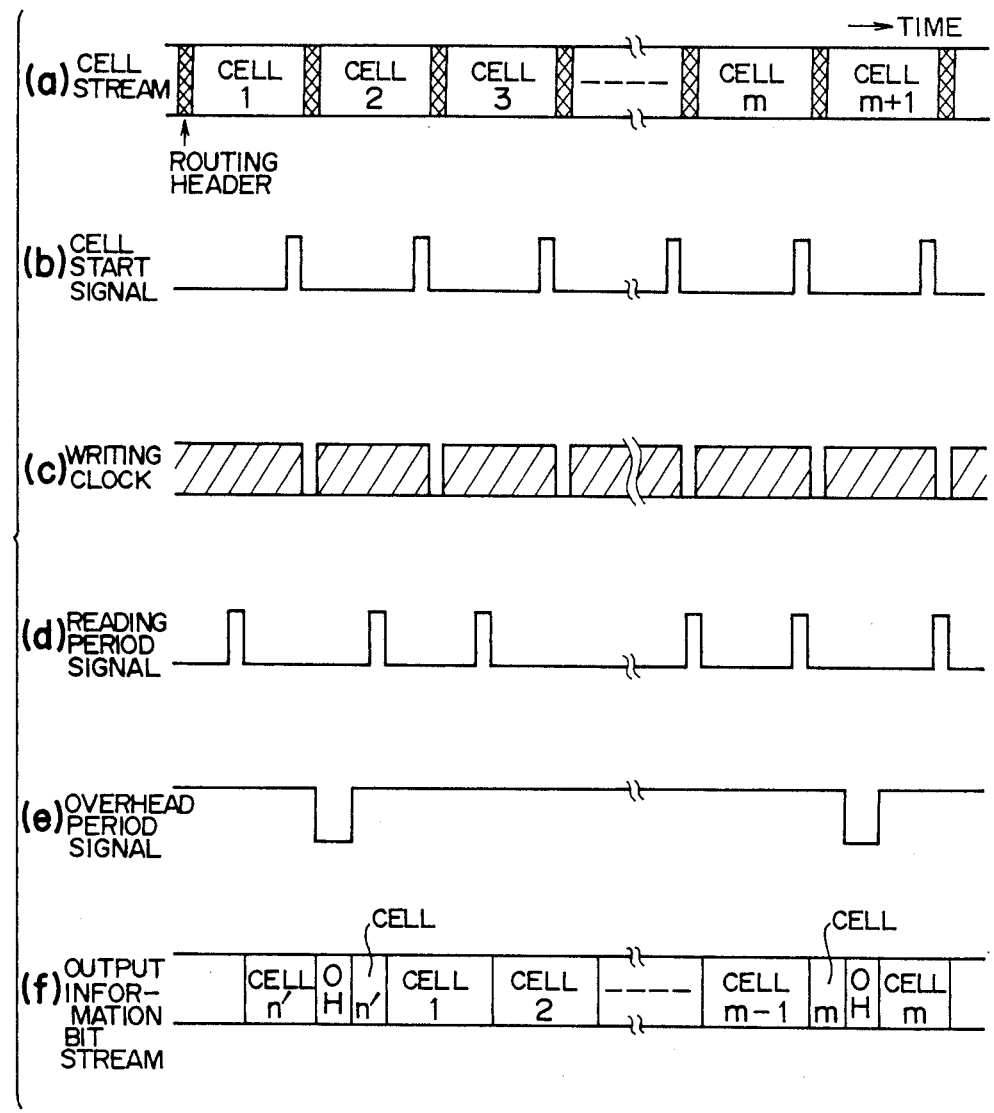
FIG. 9 is a time chart for illustrating operation of the cell phase synchronizing circuit shown in FIG. 6.

Now, operation of the circuit shown in FIG. 6 will be described. The incoming cell from the switch 110 is attached with the routing header, as shown in FIG. 9 at (a). During the period corresponding to the routing header region, the writing clock generating circuit 406 is inhibited from generating the writing clock (FIG. 9 at (c)). Thus, the write control circuit 402 allows only the cells to be written in the buffers. Every time one cell is written, the buffers are changed over from one to another in response to the cell start signal shown in FIG. 9 at (b). At the same time, the associated register of the read-ready flag register circuit 403 is set.

When the cell is to be read out from the cell synchronizing buffer circuit 401, a register value of the read-ready flag register circuit 403 is latched by the flip-flop 404 in response to the reading period signal (see FIG. 9 at (d)) generated by the reading period generating circuit 407 and supplied to the read control circuit 405 for thereby determining the buffer from which the cell is to be read out. The information representing the determined buffer is sent out to the cell synchronizing buffer unit 401 in synchronism with the cell read timing signal to thereby enable the buffer reading. On the other hand, the reading period generating circuit 407 outputs periodically an overhead period signal (see FIG. 9 at (e)) indicating the overhead region. In response to the input of the overhead period signal, the read control circuit 405 controls the cell synchronizing buffer circuit 401 for thereby causing the latter to output the overhead information. During this period, reading operation from the cell synchronizing buffer circuit 401 is suspended.

In case the buffer which has been loaded with the cell is absent in the cell synchronizing buffer circuit 401 upon reading operation, the read control circuit 405 controls the cell synchronizing buffer circuit 401 so that a blank or empty cell is sent out. Further, the read control circuit 405 prevents the read-ready flag register circuit 403 from being reset by controlling correspondingly the AND gate 409.

Now, description will be turned to the operation of the apparatus shown in FIG. 6 by reference to the time chart shown in FIG. 9. Upon arrival of the routing header contained in the cell stream (see FIG. 9 at (a)) sent out from the switch 110, the generation of the writing clock (see FIG. 9 at (c)) is suspended, during which the cell writing (loading) operation is inhibited. In response to the cell start signal (see FIG. 9 at (b)), the write control circuit 402 controls the cell synchronizing buffer circuit 401 such that the buffer to be loaded is changed over to a succeeding one, for which the writing operation is then started. At the same time, the flag representing the buffer having loaded with the cell is set at the associated register of the read-ready flag register circuit 403 to thereby memorize that buffer. Subsequently, in response to the rise-up edge of the reading period signal (see FIG. 9 at (d)) generated by the reading period generating circuit 407, an output register value of the read-ready flag register circuit 403 is latched by the flip-flop 404. In response to the falling edge of the reading period signal, the read control circuit 405 selects the buffer to be next read out. Simultaneously, the register of the read-ready flag register circuit 403 which corresponds to the buffer to be next read out is reset. On the other hand, when the overhead period signal (FIG. 9 at (e)) is outputted from the reading period generating circuit 407, the cell reading operation is suspended during the overhead period in which overhead is outputted from the cell synchronizing buffer circuit 401.

As will be understood from the above description, the cell phase synchronizing circuit according to the instant embodiment can operate to remove the unnecessary routing header on the way of transmission while inserting the overhead required on the transmission line.

Figure 10:
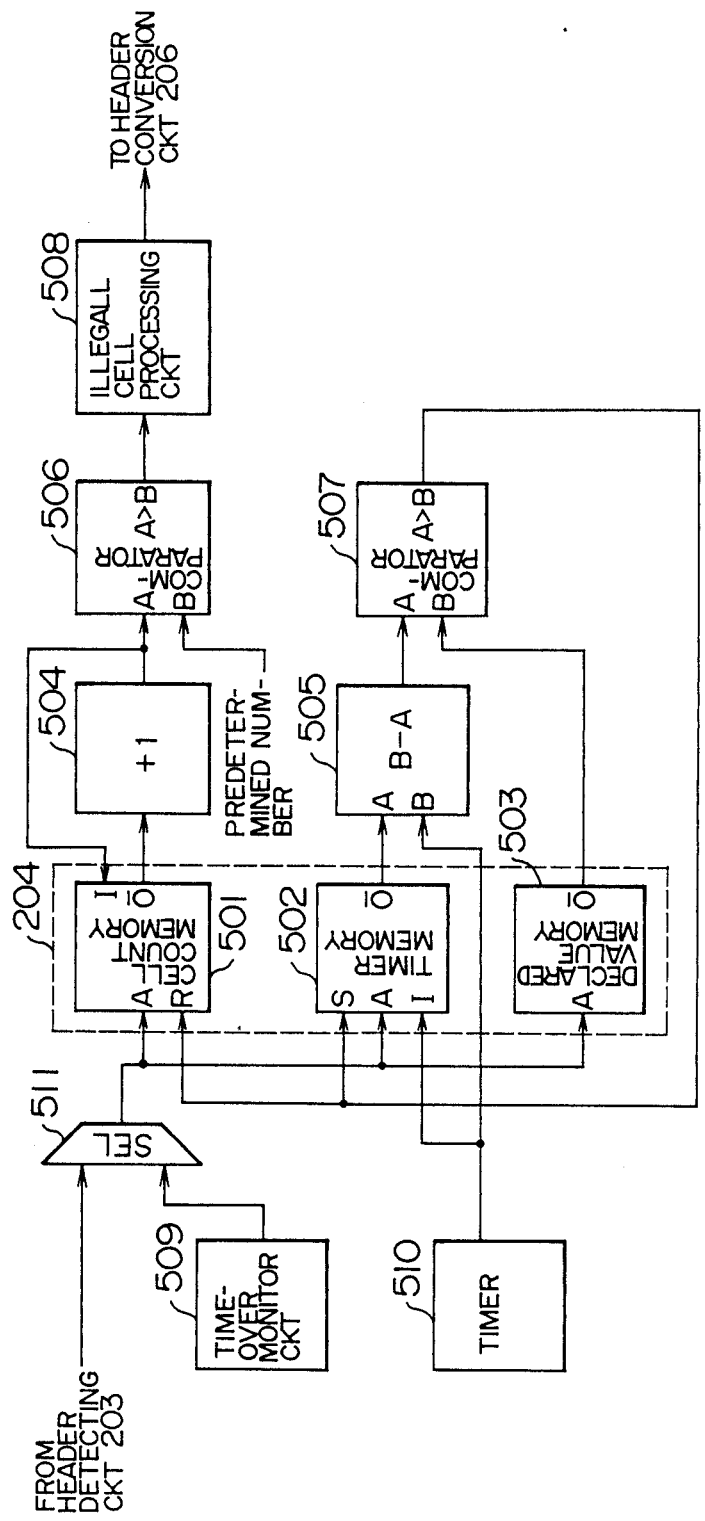
FIG. 10 is a block diagram showing a circuit configuration of a flow monitor circuit shown in FIG. 4 according to an embodiment of the invention.

FIG. 10 shows in detail an exemplary embodiment of the flow monitor circuit 205 shown in FIG. 4. Referring to FIG. 10, a reference numeral 501 denotes a cell count memory for counting and storing the number of the input cells for each of the call identification numbers. A numeral 502 denotes a timer for storing the time point at which the counting or measurement is started. A numeral 503 denotes a declared value memory for storing a declared minimum value of the time required for sending out a predetermined number N of cells declared by each subscriber upon setting of call. A numeral 504 denotes an adder for adding 1 (one) to the output value of the cell count memory 501. A numeral 510 denotes a timer adapted to output the current time information. A numeral 505 denotes a subtracter for arithmetically determining the time taken for the measurement by subtracting the output value of the timer memory 502 from the output of the timer 510. A numeral 506 denotes a comparator for comparing the arrival number of the input cells with the predetermined cell number N to thereby check whether or not the arrival number exceeds the predetermined number. A numeral 507 denotes a comparator for comparing the measured duration outputted from the subtracter 505 with the declared value to thereby make decision as to whether or not the measured duration exceeds the declared value. A numeral 508 denotes an illegal cell processing circuit for supplying to the header conversion circuit 206 a flow control signal which commands scrapping or marking the excessive cells in dependence on the output of the comparator 506. A numeral 509 denotes a time-over monitor circuit for making access to the timer memory 502 in the order of the call identification numbers during a period in which the cell flow measuring operation is not performed to thereby check whether or not the measured time exceeds the declared value. A numeral 511 denotes a selector for changing over the memory access address between the cell counting period and the time-over monitoring period. Parenthetically, in the arrangement shown in FIG. 10, the cell count memory 501, the timer memory 502 and the declared value memory 503 may be incorporated in each information table 204 of the ATM line terminating apparatus 101 - 10n, because they are accessed by using the call identification number.

Now, description will be turned to the operation of the flow monitor circuit shown in FIG. 10. Upon arrival of the cell at the ATM switch, the call identification number is issued by the header detection circuit 203. By using the call identification number as the address, access is made to the cell count memory 501, the timer memory 502 and the declared value memory 503 to obtain the flow control information corresponding to the call identification number. The count value outputted from the cell count memory 501 is added with 1 (one) by the adder circuit 504, the result of the addition being again placed in the cell count memory 501. Further, the count value resulting from the abovementioned addition is additionally inputted to the comparator 506 to be compared with the predetermined cell number N. When the former is greater than the latter, the excess flow information is messaged to the illegal cell processing circuit 508 which responds thereto by issuing to the header conversion circuit 206 the flow control signal which commands the scrapping or marking of the cells in excess. Selection between the scrapping and the marking is made in dependence on the traffic state. More specifically, the cells in excess are scrapped in the case of the overcrowed state, while the marking is selected in case the excess cells are tolerable in view of the line capacity. The marked cells are scrapped by the switch when the crowed or semi-crowed state takes place.

In parallel with the cell count operation, the subtracter 506 calculates the time taken for the measurement on the basis of the outputs of the timer 510 and the timer memory 502. The calculated time is compared with the declared time. When the former exceeds the latter, the count value of the cell count memory 501 for the call identification number of the input cell is reset, while the timer memory 502 is loaded with the current time information. Subsequently, the measurement is again started from this state.

Figure 12:
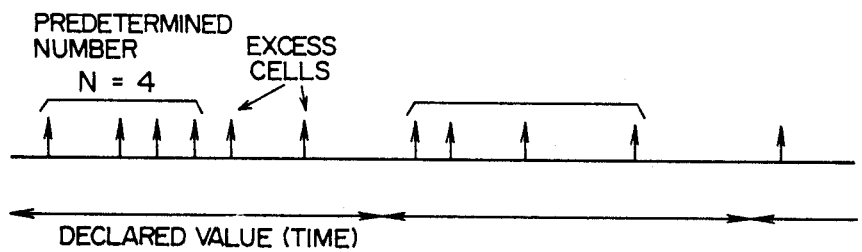
FIG. 12 is a view for illustrating operation of the flow monitor circuit shown in FIG. 10.

Operation of the cell flow monitor circuit will further be described by reference to FIG. 12 which is a view for illustrating arrival of the cells of a given identification number on the assumption that the predetermined cell number is four. As is shown in this figure, the cells are counted at the time interval corresponding to the declared value, wherein those cells which exceed the predetermined number N (=4) are handled as the excess cells. Upon lapse of the declared value or time, the succeeding measurement period is started. In this manner, the cell flow is constantly monitored.

When the cell flow monitor circuit 205 is limited only to the operation described above, there may arise such situation that the time can no more be measured correctly when the duration exceeds the time delimited by the information length of the timer memory, because the latter is accessed only at the time of arrival of the cell. To evade such situation, the time-over monitor circuit 509 is provided for making access to the addresses of the timer memory sequentially during the period in which the cell counting operation does not take place to thereby monitor whether or not the declared value is exceeded. If so, the timer memory 501 is reset with the timer memory 502 being rewritten with the current time information, whereon the succeeding measuring period is started.

According to the embodiment described above, the cell count memory 501, the timer memory 502 and the declared value memory 503 can be provided in the information table 204 of each of the ATM line terminating unit 101 to 10n, whereby amount of hardware can be reduced considerably to advantage. Further, by virtue of the flow measurement with reference to the constant number N predetermined for each call identification number, measurement even of the maximum flow rate can be accomplished correctly independent of the call rate.

Figure 11:
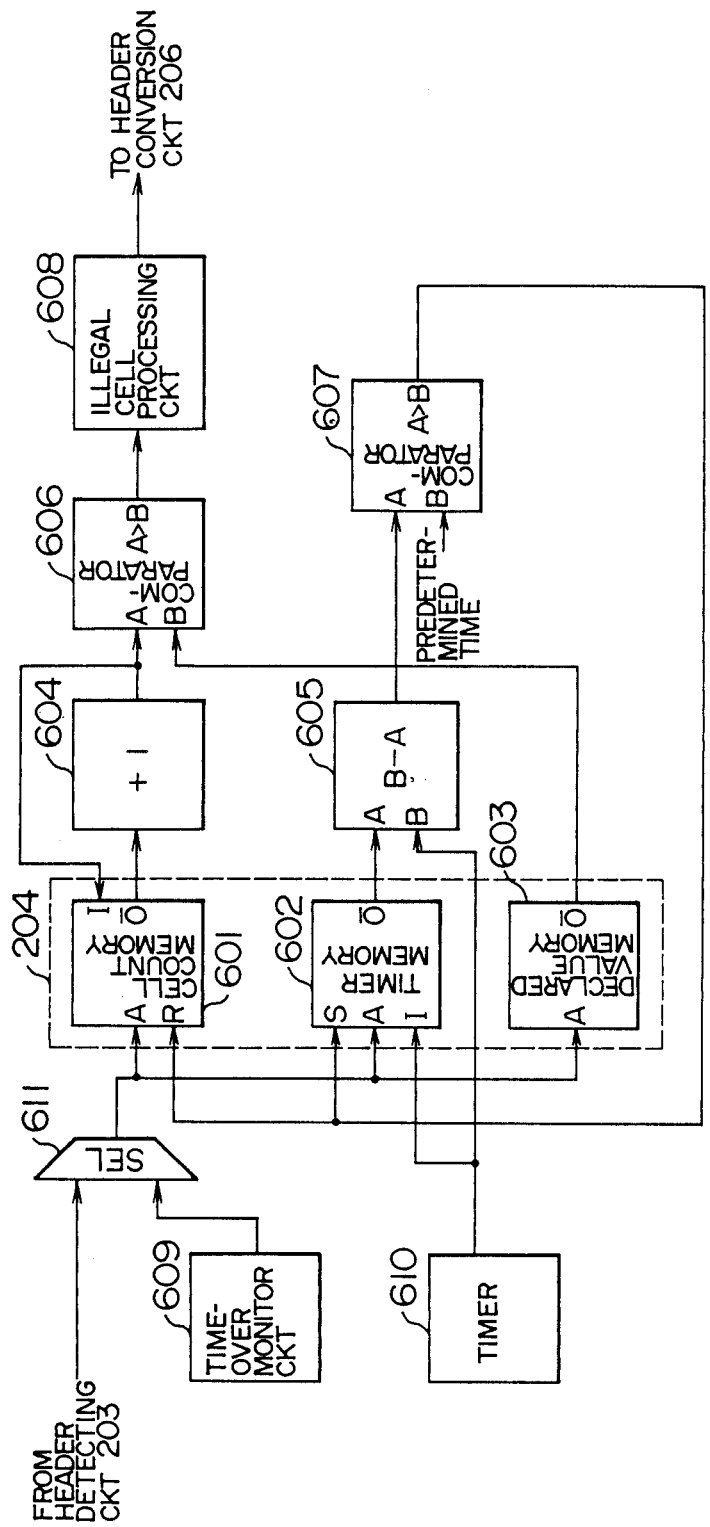
FIG. 11 is a block diagram showing another embodiment of the flow monitor circuit shown in FIG. 4 according to the invention.

FIG. 11 shows another embodiment of the flow monitor circuit 205. In this figure, a reference numeral 601 denotes a cell count memory for storing the count value representing the number of the input cells for each call identification number. A numeral 602 denotes a timer memory for storing the time at which measurement is started. A numeral 603 denotes a declared value memory for storing the declared value representing the maximum number of the cells sent out during a predetermined time period T set at the time when each subscriber issues the call. A numeral 604 denotes an adder for adding 1 (one) to the output value of the cell count memory 601. A numeral 610 denotes a timer for outputting the current time information. A numeral 605 denotes a subtracter for determining the period for measurement by subtracting the output of the timer memory 602 from the output of the timer 610. A numeral 606 denotes a comparator for comparing the arrival number of the cells with the declared value to thereby monitor whether or not the former exceeds the latter. A numeral 607 denotes a comparator for comparing the measurement period outputted from the subtracter 605 with the predetermined time T for thereby monitoring whether or not the measurement period exceeds the declared value. A numeral 608 denotes an illegal cell processing circuit for supplying to the header conversion circuit 206 a flow control signal commanding the scrapping or marking of the cells in excess in the cell flow. A numeral 609 denotes a time-over monitoring circuit for generating memory addresses to make access sequentially to the timer memory 602 in the order of the call identification numbers for the purpose of monitoring whether or not the measurement period exceeds the declared value. A numeral 611 denotes a selector for changing over the memory access address between the cell count period and the time-over monitoring period. Parenthetically, in the arrangement shown in FIG. 11, the cell count memory 601, the timer memory 602 and the declared value memory 603 may be incorporated in the information tables 204 of the ATM line terminating unit 101 to 10n, respectively, since they are accessed with the call identification numbers of the input cells.

Now, description will be turned to the operation of the flow monitor circuit shown in FIG. 10. Upon arrival of the cell at the ATM switch, the call identification number is issued by the header detection circuit 203. By using the call identification number as the address, access is made to the cell count memory 601, the timer memory 602 and the declared value memory 503 to obtain the flow control information corresponding to the call identification number. The count value outputted from the cell count memory 601 is added with 1 (one) by the adder circuit 604, the result of the addition being again placed in the cell count memory 601. Further, the count value resulting from the abovementioned addition is additionally inputted to the comparator 606 to be compared with the declared value. When the former is greater than the latter, the excess flow information is messaged to the illegal cell processing circuit 608 which responds to the excess flow information by issuing to the header conversion circuit 206 the flow control signal which commands the scrapping or marking of the cells in excess. Selection between the scrapping and the marking is made in dependence on the traffic state. More specifically, the cells in excess are scrapped in the case of the overcroweded state, while the marking is selected in case the excess cells are tolerable in view of the line capacity.

In parallel with the cell count operation, the subtracter 605 calculates the time taken for the measurement on the basis of the outputs of the timer 610 and the timer memory 602. The calculated time is compared with the predetermined time T. When the former exceeds the latter, the count value of the cell count memory 601 for the call identification number of the input cell is reset, while the timer memory is loaded with the current time information Then, the measurement is again started from this state.

Figure 13:
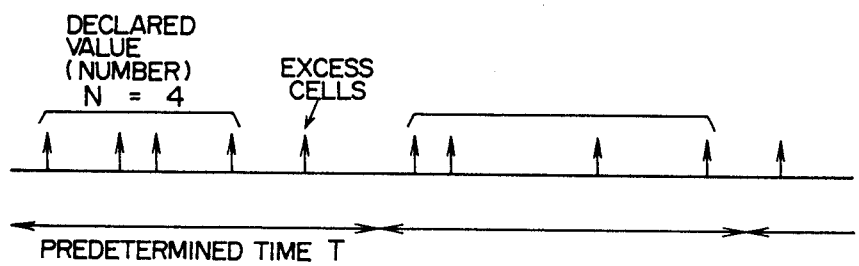
FIG. 13 is a view for illustrating operation of the flow monitor circuit shown in FIG. 11.

Operation of the cell flow monitor circuit according to the instant embodiment will further be described by reference to FIG. 13 which is a view for illustrating arrival of the cells of a given identification number on the assumption that the declared value is four. As is shown in this figure, the cells are counted at a constant time interval, wherein those cells which exceed the declared value of "4" are handled as the excess cells. Upon lapse of the predetermined time, the succeeding measurement period is started. In this manner, the cell flow is constantly monitored.

When the cell flow monitor circuit is limited only to the operation described above, there may arise such situation that the time can no more be measured correctly when the duration exceeds the time delimited by the information length of the timer memory, because the latter is accessed only at the time of arrival of the cell. To evade such situation, the time-over monitor circuit 609 is provided for making access to the timer memory 602 sequentially during the period in which the cell counting operation does not take place, to thereby monitor whether or not the predetermined time T is exceeded. If so, the timer memory 601 is reset with the timer memory 602 being rewritten with the current time information, whereon the succeeding measuring period is started.

According to the embodiment described above, the cell count memory 601, the timer memory 602 and the declared value memory 603 can be provided in the information table 204 of each of the ATM line terminating units 101 to 10n, whereby amount of hardware can be reduced to advantage. Further, by virtue of the flow measurement with reference to the constant time predetermined for each call identification number, the upper limits of the cell count memory 601 and the timer memory 602 can advantageously be determined independent of the call rate when the time taken for measurement is long as in the case of the measurement of the average rate.

Figure 14:
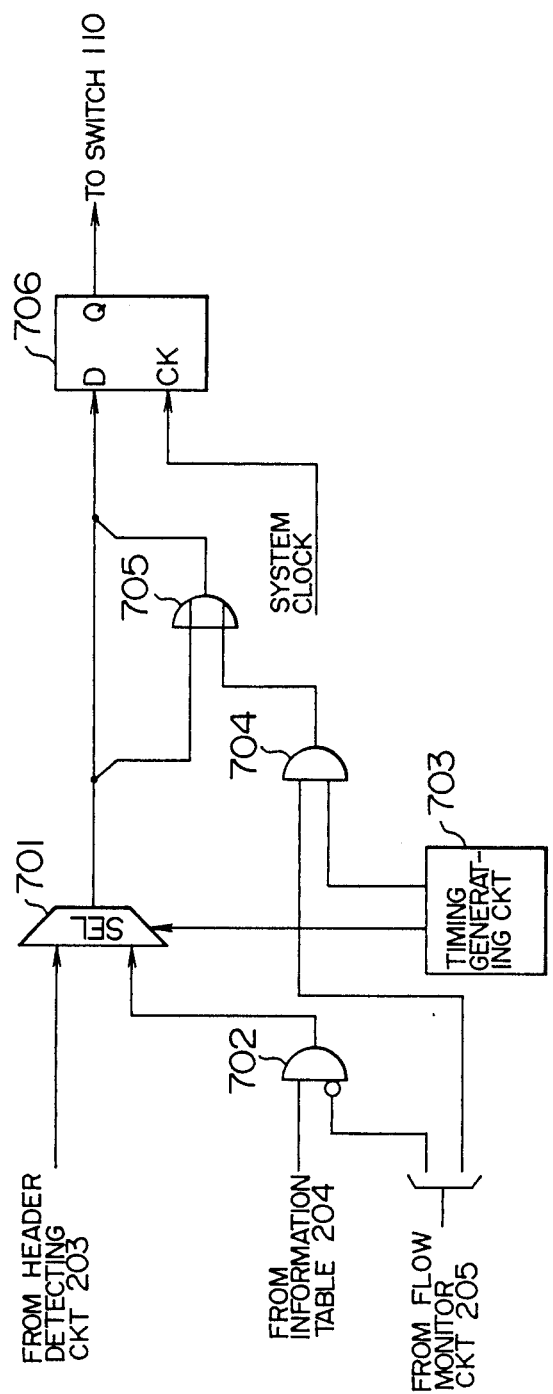
FIG. 14 is a schematic circuit diagram showing a configuration of a header conversion circuit shown in FIG. 4 according to an embodiment.

FIG. 14 shows in detail an exemplary embodiment of the header conversion circuit 206 shown in FIG. 4. Referring to FIG. 14, a reference numeral 701 denotes a selector for inserting routing information and new call identification numbers in a predetermined timing, 702 denotes an AND gate for scrapping the cell by setting the identification number thereof to "0", 704 denotes an AND gate for marking the cell by setting to "1" a mark bit contained in the header of the cell, and a numeral 705 denotes a flip-flop serving for signal regeneration. In operation of the header conversion circuit 206, the sending of the cells to the switch 110 from the ATM line terminating apparatus 101 - 10n is performed by using the format illustrated in FIG. 2 at (b). To this end, in the conversion circuit 206, the routing header information corresponding to the call identification number of the cell contained in the information table 204 is inserted in the routing header region of two bytes provided at the start of the cell region by the selector 701 controlled by a timing generating circuit 703. Subsequently, the call identification number read out from the information table 204 is inserted at a predetermined position in the cell in place of the call identification number as inputted. At that time, when the flow control signal commanding the cell scrap is issued by the flow monitor circuit 205, the call identification number is set to "0" by the AND gate 702, whereby the associated cell is discarded in the switch 110.

When the flow control signal commanding the marking is issued by the flow monitor circuit 205, "1" is placed at the mark bit shown in FIG. 2 at (b) under the control of a control signal from the time generating circuit 703. The cell undergone the header conversion processing described above is inputted to the self-routing switch 110 with accurate phase resulting from the signal regeneration by the flip-flop 706.

According to the embodiment of the header conversion circuit described above, insertion of the routing header, rewriting of the cell identification number and the marking can simultaneously be realized, which means that the amount of hardware as well as the delay of the cell can be reduced.

The information table 204 shown in FIG. 4 will be described in more detail by referring to FIG. 15 which is a view showing examples of information stored in the information table 204 together with the storing format. In the case of the instant embodiment, stored in the information table 204 by making use of the input call identification numbers as the addresses are the output call identification numbers to be imparted to the cell by the header conversion circuit 206 as well as the declared values, cell count values, timer values and the number of the illegal cells which are utilized by the flow monitor circuit 205. By storing the information en bloc for each call identification number in this manner, the amount of the hardware can be reduced.

As will be appreciated from the foregoing description, according to the invention, there can be realized economically and efficiently a speech path system for the ATM switch for exchanging communication information by using fixed-length cells (packets) each including the header field for the routing purpose and the information field. It will further be noted that the functional block arrangement has high compartibility with the system processing hierarchy (protocol layers). In other words, the individual blocks have high degree of independecy, making it easy to realize interconnections among the blocks. On the other hand, within a given block, a plurality of functions can share same hardware with one another, which also contributes to highly effective and economical implementation.

Other several embodiments of the cell phase synchronizing circuit 202 shown in FIG. 4 will be described in detail by referring to FIGS. 16 to 26. The following description is directed to only those parts that partake in the information transmission from the line terminating apparatus 201 to the header detecting circuit 203. The parts participating in the information transmission from the switch 110 to the line terminating circuit 201 may be realized similarly to those of the embodiments described above or implemented on the basis of the suggestion given in the following description.

Figure 16:
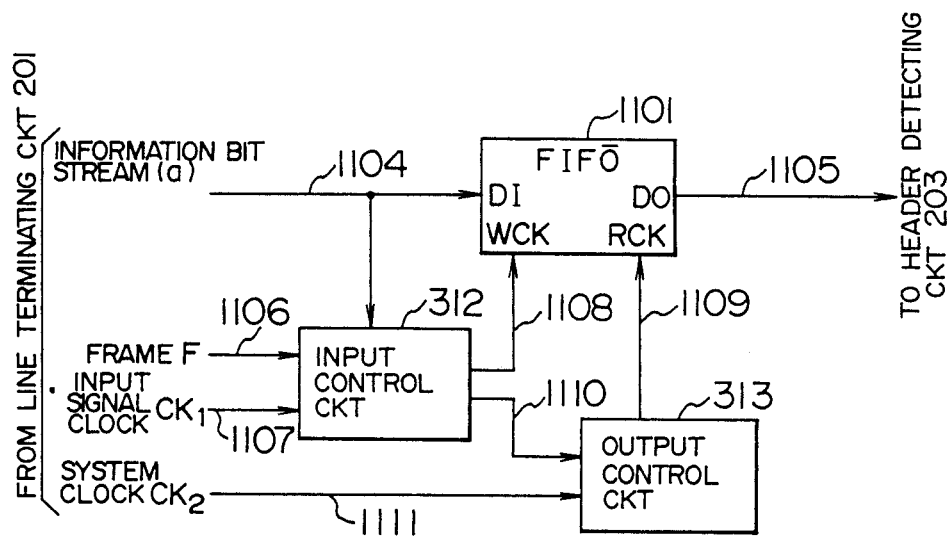
FIG. 16 is a block diagram showing another embodiment of the cell phase synchronizing circuit shown in FIG. 4 according to the invention.

FIG. 16 is a block diagram showing a structure of the cell phase synchronizing circuit 202 according to another embodiment of the invention. In FIG. 16, reference numeral 1101 denotes a first-in first-out memory (hereinafter referred to as FIFO) which is used for the storage of the cells and which allows the read and write operations to be performed independent of each other, and 312 denotes an input control circuit for controlling the writing of the cells in the payload field by the FIFO 1101. A numeral 313 denotes an output control circuit for reading out the cells from the FIFO 1101 in phase synchronization, 1104 denotes an input line, 1105 denotes an output line, 1106 denotes a frame signal line, 1107 and 1111 denotes clock lines, respectively, 1108 denotes a write control line, 1109 denotes a read control line and a numeral 1110 denotes an activation signal line.

In operation of the cell phase synchronizing circuit 202 of the structure described above, the incoming information stream transmitted through the input line 1104 has a format for transmission illustrated in FIG. 27. The cells contained in the input information stream are sequentially written in the FIFO 1101. For controlling this writing operation, the input control circuit 312 detects the positions of the cells on the basis of a frame signal F generated by the line terminating circuit 201, an input signal clock CK1 extracted from the input information bit stream and the information contained in the overhead for transmission located at the start of the frame of the input information bit stream and indicating the start position and the blank area of the payload field, to thereby supply the writing clock to the FIFO 1101 through the write control line 1108 only during the cell arrival period. On the other hand, the control operation for controlling the reading of the cells from the FIFO 1101 is carried out by generating the reading clock on the basis of a system synchronizing clock CK1 and an activation signal S5 outputted from the input control circuit 312 upon activation thereof and sending the reading clock to the FIFO 1101 by way of the reading control line 1109.

Figure 17:
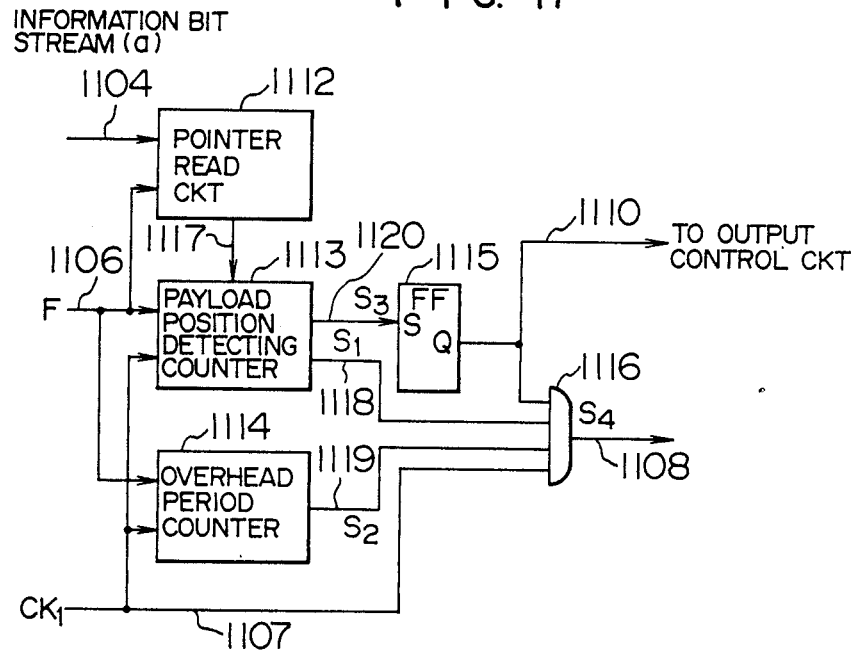
FIG. 17 is a block diagram showing a configuration of an input control circuit shown in FIG. 16 according to an embodiment of the invention.

The structure and operation of the abovementioned input control circuit 312 will be described more in detail by reference to FIGS. 17 and 18. FIG. 17 is a block diagram showing the structure of the input control circuit 312. In FIG. 17, a reference numeral 1112 denotes a pointer read circuit which fetches by reading the signals indicating the start position of the payload field an the position of the blank area from the transmission overhead field located at the start of the frame of the input information stream in accordance with frame signal F and sending out the result of the reading to the pointer signal line 1117. A numeral 1113 denotes a payload position detecting counter which generates a blank area detection signal $S_1$ indicating the blank area and a payload position detection signal $S_3$ on the basis of the pointer information, the frame signal and the input signal clock CK1 to thereby send out the signals $S_1$ and $S_3$ onto a blank area detection signal line 1118 and a payload position detection signal line 1120, respectively. A numeral 1114 denotes an overhead period counter which serves to detect the position of the overhead on the basis of the frame signal F and the input signal clock CK1 and send out an overhead detection signal $S_2$ onto an overhead detection signal line 1119. A numeral 1115 denotes a set-reset type flip-flop, and 1116 denotes an AND gate for gate-controlling the write clock.

Figure 18:
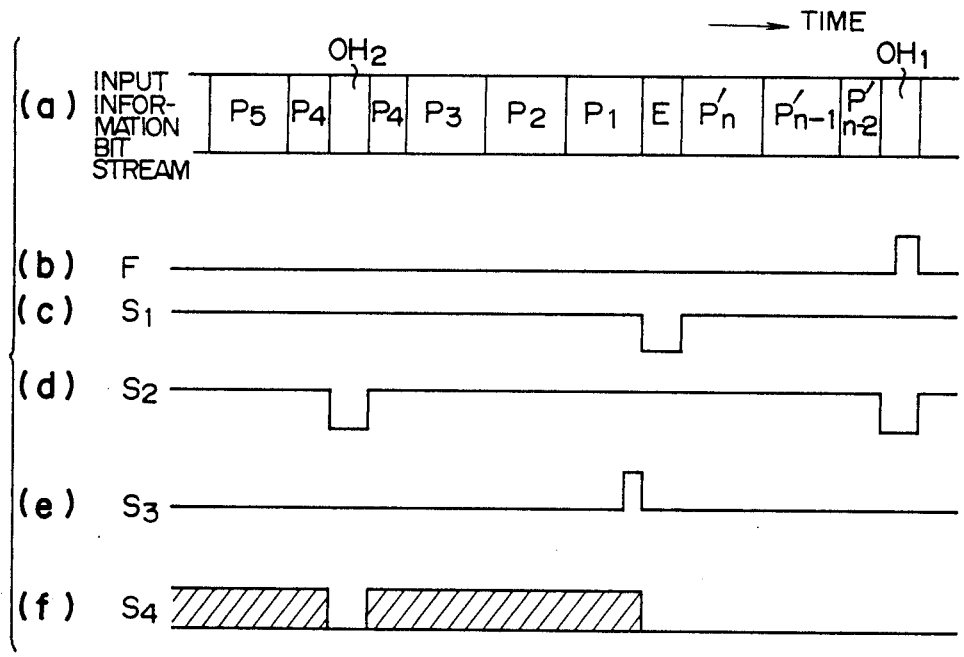
FIG. 18 is a time chart for illustrating operation of the input control circuit shown in FIG. 17.

FIG. 18 is a time chart for illustrating, by way of example, operation of the input control circuit 312. There is shown in this figure at (a) a format of input transmission signal, in which OH1 and OH2 designate overheads for transmission, respectively, $P'_{n-2}$ to $P'_n$ and $P_1$ to $P_5$ designate cells each of a fixed length, and E designates a blank area in the payload field, as with the case of FIG. 27. In FIG. 18, reference symbol $S_4$ designates the write clock sent out to the write control line 1108, wherein hatched region represents the sending of the clock.

Next referring to FIG. 18, operation of the input control circuit 312 will be described. FIG. 18 is a view for illustrating the operation of the circuit 312 at the time of activation thereof. Upon inputting of the frame signal F, the pointer read circuit 1112 is activated to send out the signals indicating the start position of the payload field and the blank area to the payload position counter 1113. The latter responds to the input signals by counting the input signal clock CK1 for detecting the blank area and the payload field, whereon the blank area detection signal $S_1$ and the payload position detection signal $S_3$ are outputted from the payload position detection counter 1113. The set-reset type flip-flop 1115 is set by the activation signal $S_3$, wherein the output of that flip-flop 1115 is used for controlling the AND gate 1116 such that the write clock $S_4$ is sent out to the FIFO 1101 shown in FIG. 16 by way of the write control line 1108. Thus, the writing operation is started from the cell $P_1$. Thereafter, the write clock $S_4$ is stopped upon arrival of the overhead for transmission and the blank area under the control of the AND gate 1116 based on the blank area signal $S_1$ and the overhead detection signal $S_3$. Thus, only the cells are written in the FIFO 1101.

Figure 19:
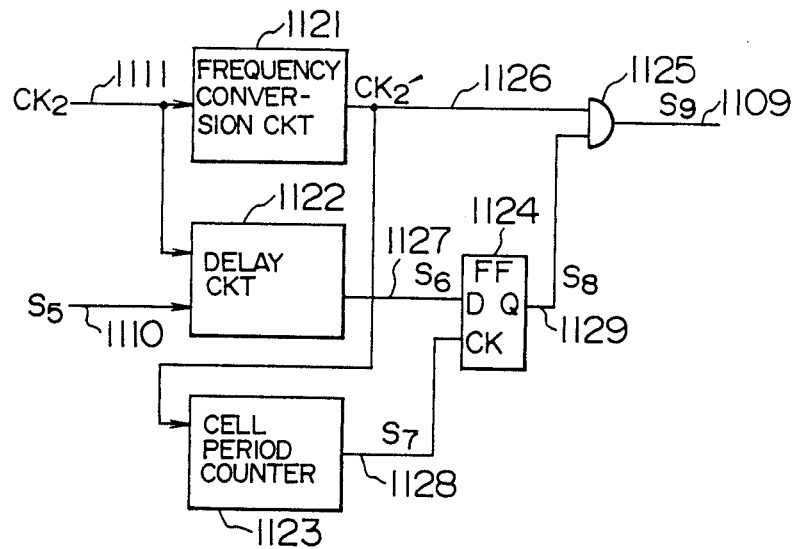
FIG. 19 is a block diagram showing a configuration of an output control circuit shown in FIG. 16 according to an embodiment of the invention.
Figure 20:
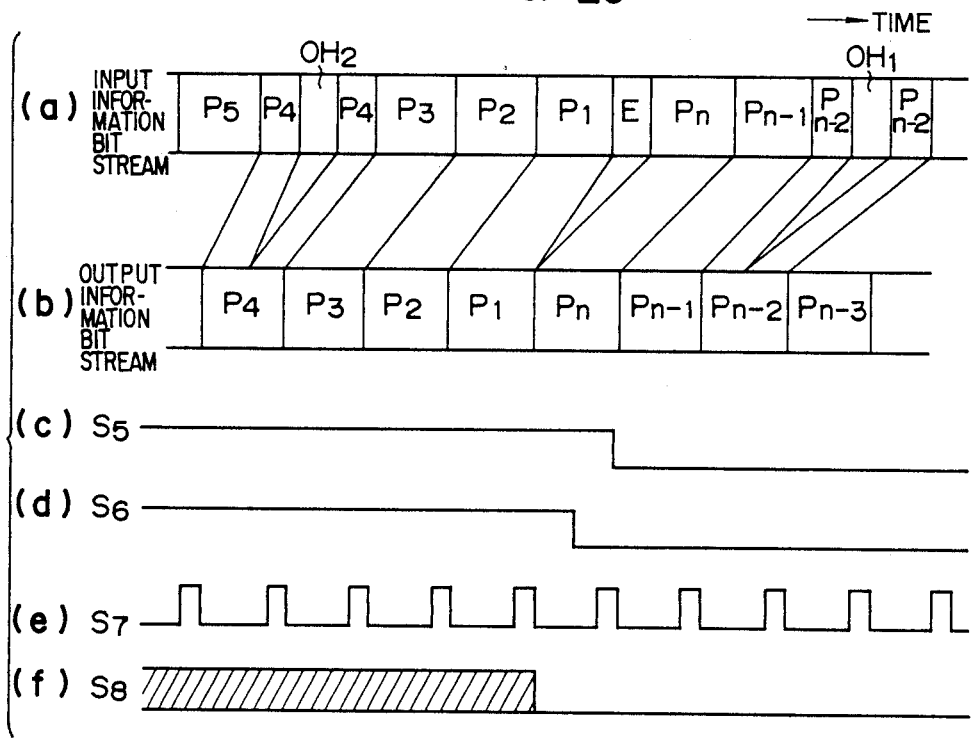
FIG. 20 is a time chart for illustrating operation of the output control circuit shown in FIG. 19.

Next, detailed description is turned to a structure and operation of the output control circuit 313 by reference to FIGS. 19 and 20. FIG. 19 is a block diagram showing a circuit arrangement of the output control circuit 313. In FIG. 19, reference numeral 1121 denotes a frequency of the system clock CK2 for synchronization to the rate necessary and sufficient for transmitting all the cells in the payload field to thereby generate a clock CK2' for transmission. A numeral 1122 denotes a delay circuit for generating a read enable signal $S_6$ by delaying the activation signal $S_5$ supplied from the input control circuit 312 by the length of the overhead field for transmission by using the system clock CK2 for synchronization, the read enable signal $S_6$ being then sent onto a read enable signal line 1127. A numeral 1123 denotes a cell period counter for generating the cell period signal $S_7$ having pulses generated every cell period by counting the clock CK2' for the switch. A numeral 1124 denotes an edge trigger type flip-flop, 1125 denotes an AND gate for controlling the output of the read clock $S_9$, 1126 denotes a clock signal line, and a numeral 1129 denotes a read clock control line. FIG. 20 is a time chart for illustrating operation of the output control circuit upon activation thereof on the assumption that the information stream is same as that shown in FIG. 18, by way of example. Upon input of the activation signal $S_5$, the read enable signal $S_6$ delayed by the region length of the overhead for transmission is generated by the delay circuit 1122 and inputted to the edge trigger type flip-flop 1124, which is set by the cell period signal $S_7$ generated in succession to be read enable signal $S_6$, resulting in that the AND gate 1125 is controlled by the output $S_8$ of the flip-flop 1124 such that the read clock $S_9$ is sent out to the FIFO 1101 shown in FIG. 16 over the read control line 1109, whereupon the cell reading operation is started. More specifically, by virtue of interposition of at least the field length of the overhead for transmission between the start of the writing operation and that of the reading operation and due to the storage of the cells in excess substantially corresponding to the field length of the overhead for transmission during the overhead period because the cell reading rate is lower than the cell writing rate, there can never arise such possibility that the cells stored in the FIFO 1101 becomes zero even when no cell is written because of arrival of the overhead field for transmission on the input line. Thus, the cells can be read out successively. In this manner, the cells are successively sent out on the output line 1105 of the cell phase synchronizing circuit according to the instant embodiment with the overhead field for transmission and the empty area E on the input line 1104 having been removed, as can be seen from the output information bit stream shown in FIG. 20 at (b). It should be noted that the cells as sent out are synchronized in phase with the cell synchronizing signal $S_7$.

When the cells on a plurality of input lines are to be synchronized in phase according to the teaching incarnated in the instant embodiment, this can be accomplished by using in common to the plural input lines the frequency conversion circuit 1121 and the cell period counter 1123 of the output control circuit 313.

In the case of the instant embodiment of the input control circuit, it is necessary that the FIFO 1101 for storing the cells has a capacity of (L+M+N) bytes (e.g. 64 bytes) in total, i.e. L bytes (e.g. 10 bytes) for absorbing variation in phase as brought about by the overhead field for transmission, N bytes (e.g. 40 bytes) for the blank area E and M bytes (e.g. 64 bytes) for the phase matching. This capacity is significantly smaller than the frame length of (L+0)P bytes required for the frame synchronization, wherein "0" and "P" are, for example, 270 and 9 bytes, respectively. Thus, it is possible to realize the cell phase synchronization by using the FIFO of a small capacity (exemplified by a buffer memory). Additionally, the time taken for storage of the cell in the FIFO is reduced with the delay due to the phase synchronization being diminished to further advantage.

Figure 21:
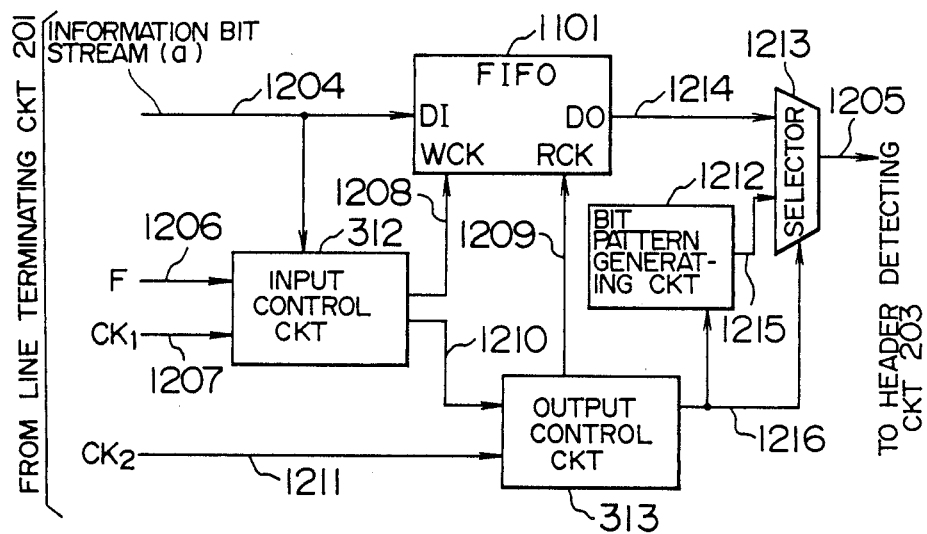
FIG. 21 is a block diagram showing another embodiment of the cell phase synchronizing circuit shown in FIG. 4 according to the invention.
Figure 22:
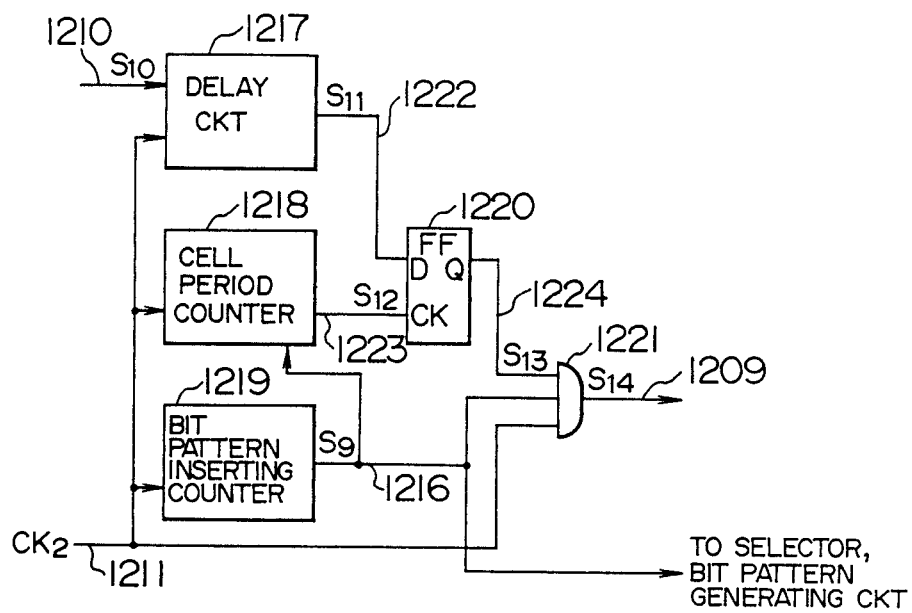
FIG. 22 is a block diagram showing a configuration of the output control circuit shown in FIG. 21 according to an embodiment of the invention.
Figure 23:
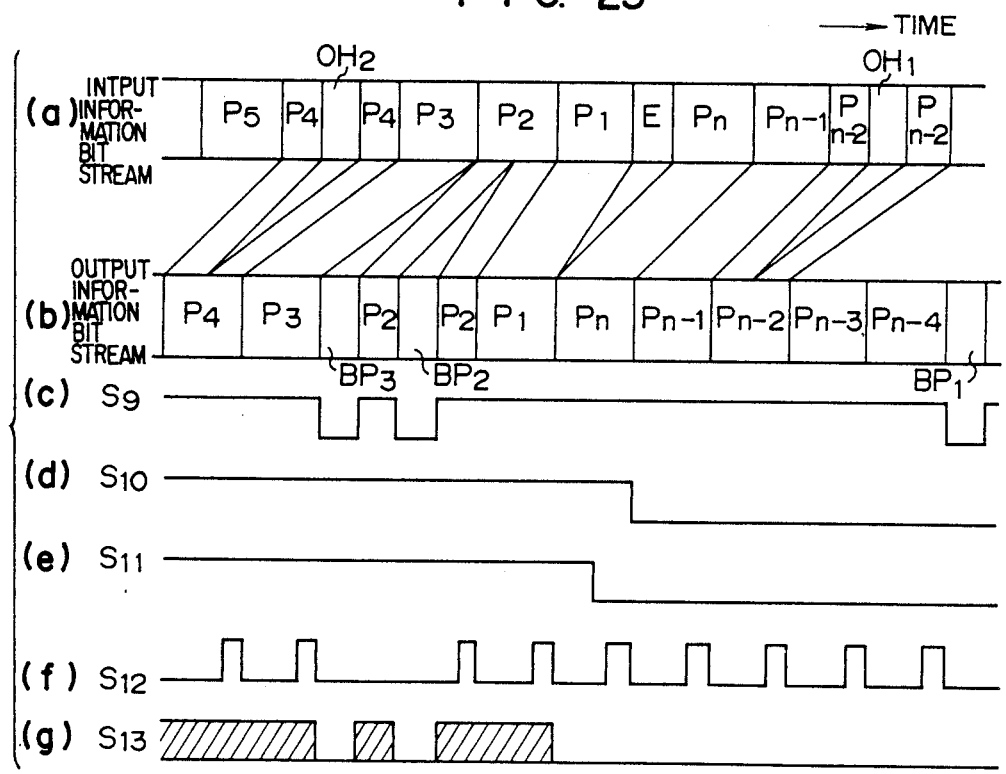
FIG. 23 is a time chart for illustrating operation of the output control circuit shown in FIG. 22.

Another embodiment of the cell phase synchronization circuit 202 will be described by reference to FIGS. 21 to 23. First referring to FIG. 21 showing a circuit configuration of the cell phase synchronization circuit according to another embodiment of the invention, reference numeral 1101 denotes a FIFO, 312 denotes an input control circuit, 313 denotes an output control circuit, 1204 denotes an input line, 1205 denotes an output line, 1206 denotes a frame signal lie, 1207 and 1211 denote clock signal lines, respectively, 1208 denotes a write control line, 1209 denotes a read control line, and a numeral 1210 denotes an activation signal line. Further, reference numeral 1212 denotes a bit pattern generating circuit for generating a predetermined bit pattern, 1213 denotes a selector for selecting one of the outputs of the FIFO 1101 and the bit pattern generating circuit 1212, 1214 denotes an output line of the FIFO 1101, a numeral 1215 denotes an output line of the bit pattern generating circuit 1212, and a numeral 1216 denotes a bit pattern insert signal line. Of the parts mentioned above, the FIFO 1101 and the input control circuit 312 operate in the same manner as in the case of the preceding embodiment. In general, the output control circuit 313 according to the instant embodiment is so arranged as to control the cell reading operation by sending the read clock to the FIFO 1101 and additionally control the bit pattern generating circuit 1212 and the selector 1213 in such a manner that a predetermined bit pattern is inserted in the output information bit stream.

Now, the structure as well as operation of the output control circuit 313 will be described in detail by reference to FIG. 22 which is a block diagram showing an exemplary configuration of the output control circuit 313. In FIG. 22, a reference numeral 1217 denotes a delay circuit designed to serve for the same function as that of the delay circuit 1122 in the preceding embodiment. A numeral 1218 denotes a cell period counter for generating a cell period signal $S_{12}$ including pulses generated every cell period by counting the synchronizing system clock CK2, the cell period signal $S_{12}$ as generated being sent out on a cell period signal line 1223. A numeral 1219 denotes a bit pattern inserting counter for outputting on a bit pattern insert signal line 1216 the signal $S_9$ for inserting a bit pattern which is coincident with the period and the length of the overhead field for transmission and those of the blank area E of the payload field in the input information bit stream. Further, a numeral 1220 denotes an edge trigger type flip-flop, 1221 denotes an AND gate, 1222 denotes a read enable signal line, 1223 denotes a cell synchronizing signal line and numeral 1224 denotes a read clock control line. FIG. 23 is a time chart for illustrating operation of the read control circuit 1203 upon activation thereof on the assumption that the input information bit stream shown at (a) is identical with that shown in FIG. 20 at (a). Upon inputting of the activation signal $S_{10}$, the delay circuit 1217 first generates the read enable signal $S_{11}$ with a delay corresponding to the length of the overhead for transmission by the delay circuit 1217. In response to the cell period signal $S_{12}$ generated subsequently, the edge trigger type flip-flop 1220 is set, resulting in that the AND gate 1221 is so controlled by the output $S_{13}$ of the flip-flop 1220 that the read clock $S_{14}$ is sent out to the FIFO 1101 shown in FIG. 21 over the read control line 1209, whereon the cell reading operation is started. The bit pattern insert counter 1219 control the AND gate 1221 by the bit pattern insert signal $S_9$ every period of the overhead field for transmission and every period of the blank area E such that the sending of the read clock $S_{14}$ is stopped, while the bit pattern generating circuit 1212 and the selector 1213 shown in FIG. 21 are so controlled that the predetermined bit pattern can be sent out on the output line 1205. The bit pattern insert signal $S_9$ is additionally inputted to the cell period counter 1218 to thereby disenable the operation of the cell period counter 1218 so long as the bit pattern is inserted. In this case, the cell generation period is elongated by the period required for the insertion of the bit pattern. As will be appreciated from the foregoing, by virtue of interposition of at least the length of overhead for transmission between the start of cell writing operation and that of the cell reading operation as well as the insertion in the output information bit stream of the predetermined bit patterns having the periods and the lengths identical with those of the overhead field for transmission and the blank area E, respectively, there can arise no such possibility that the cells stored in the FIFO 1101 become zero even when the cells are not written due to the arrival of the overhead for transmission on the input line. In other words, the cells can be read out successively except for the period during which the bit pattern is sent out. In this manner, according to the instant embodiment, there is generated on the output line 1205 of the cell phase synchronizing circuit a signal in which the predetermined bit patterns ($BP_1$, $BP_2$, $BP_3$) replacing the overhead field for transmission and the blank area E on the input line 1204 are inserted, as can be seen in the information bit stream shown in FIG. 23 at (b), wherein the cell is synchronized in phase with the cell synchronizing signal $S_{11}$. It should however be noted that phase relations between the cells ($P_{n-4}$, $P_4$) and the bit pattern ($BP_1$, $BP_2$) corresponding to the overhead for transmission and the bit pattern ($BP_3$) corresponding to the blank area E may be established arbitrarily.

Also in the case of the instant embodiment, when phase synchronization for the cells on a plurality of input lines is to be established, this can be achieved by using in common to the plural input lines the cell synchronization counter 1218 and the bit pattern insert counter of the output control circuit 313.

According to the instant embodiment, it is required that the FIFO 1101 for storing the cells has a capacity of 2 (L+M+N) bytes in total, wherein L represents the number of bytes for absorbing the phase variation or fluctuation due to the overhead for transmission, N represents the number of bytes for the blank area E, M represents the number of bytes required for the phase matching on a cell basis and L represents the number of bytes involved by an increase in the number of the cells to be stored when the bit pattern corresponding to the overhead field for transmission is inserted. It is apparent that the capacity of the FIFO 1101 is considerably small when compared with the capacity given by (L+0) P bytes (frame length) required for realizing the frame synchronization. Thus, the phase synchronization according to the instant embodiment can be implemented by using a FIFO (buffer memory) of a small capacity of advantage. Additionally, the period for which the cells are stored in the FIFO can be correspondingly reduced with the delay involved in the phase synchronization being decreased to further advantage. Besides, it should be mentioned that the frequency conversion circuit 1121 required in the case of the preceding embodiment can be spared in the cell phase synchronization circuit according to the instant embodiment. Further, it becomes possible to transmit the transmission control signals and other information by making use of the predetermined bit patterns inserted in the output information bit stream.

Figure 24:
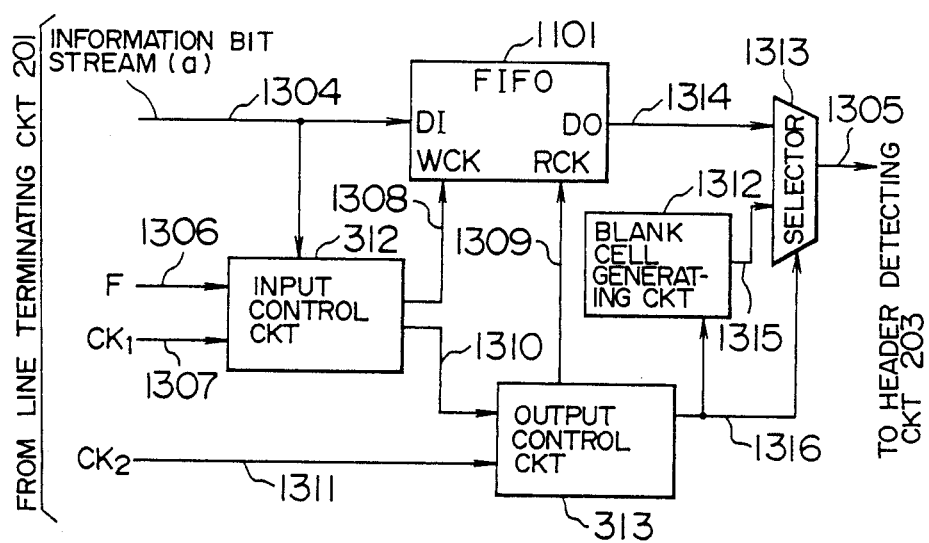
FIG. 24 is a block diagram showing a further embodiment of the cell phase synchronizing circuit shown in FIG. 4 according to the invention.
Figure 25:
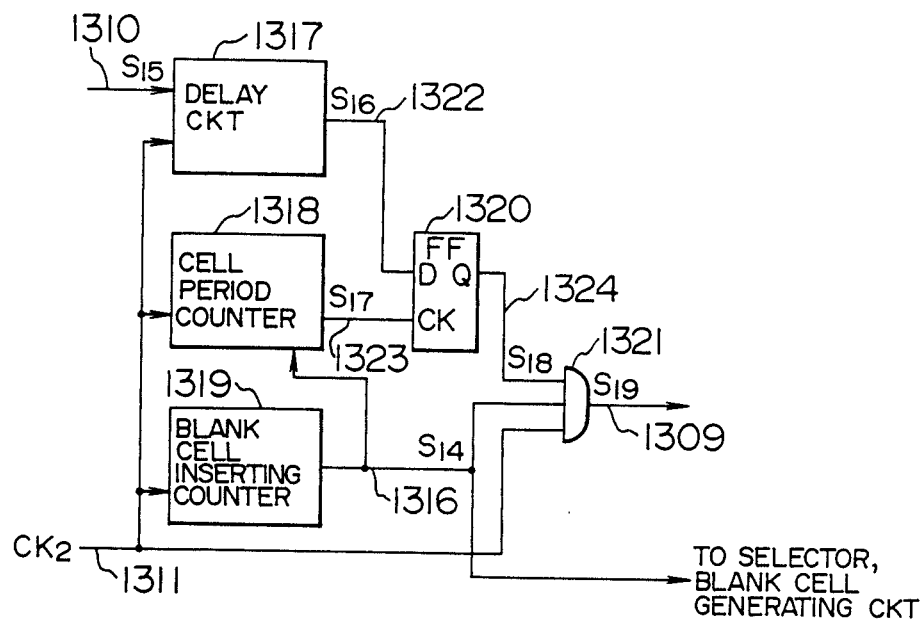
FIG. 25 is a block diagram showing a configuration of the output control circuit shown in FIG. 24.
Figure 26:
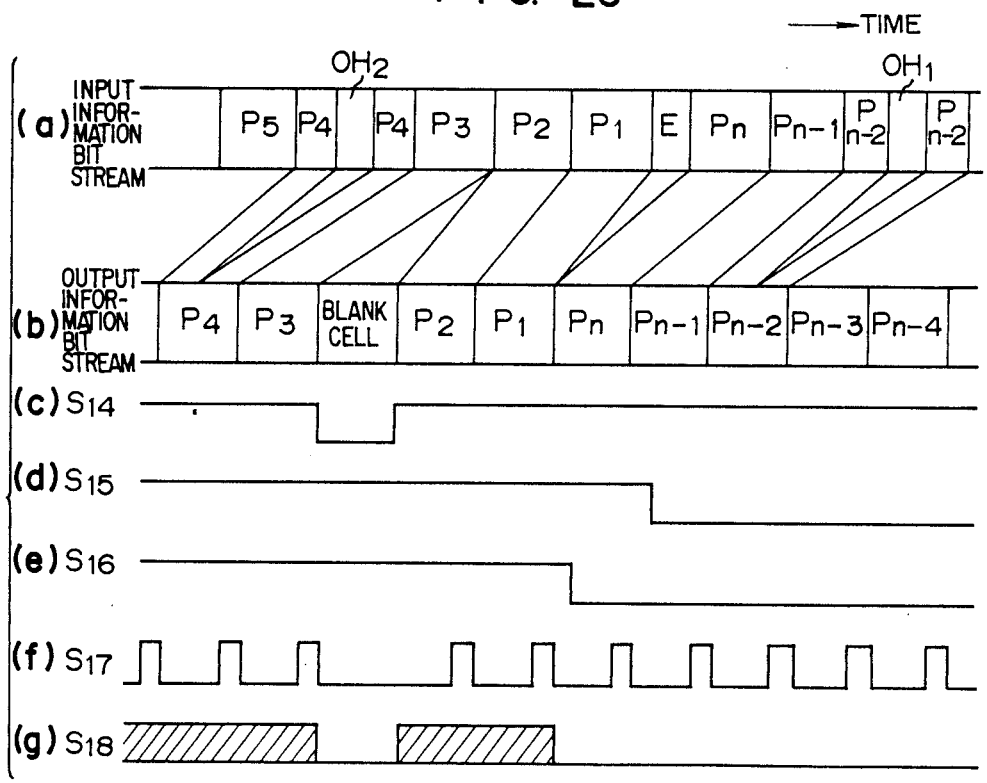
FIG. 26 is a time chart for illustrating operation of the output control circuit shown in FIG. 24.

Another exemplary embodiment of the cell phase synchronization circuit 202 will be described by reference to FIGS. 24 to 26. According to the instant embodiment, the cell length (M) is so selected as to be equal to a quotient resulting from division of the sum of the length (L×P) of overhead regions for transmission and the blank region length (N) by an integer. FIG. 24 is a block diagram showing a configuration of the cell phase synchronization circuit 202 according to the instant embodiment. In the figure, a reference numeral 1101 denotes a FIFO, 312 denotes an input control circuit, 313 denotes an output control circuit, 1304 denotes an input line, 1305 denotes an output line, 1306 denotes a frame signal line, 1307 and 1311 denote clock signal lines, respectively, 1308 denotes a write control line, 1309 denotes a read control line, 1310 denotes an activation signal line, 1312 denotes a blank cell generating circuit for generating blank cells having no information and included in the cells of the input information stream, 1313 denotes a selector for selecting either one of the outputs of the FIFO 1101 and the blank cell generating circuit 1312, a numeral 1314 denotes an output line of the FIFO 1101, 1315 denotes an output line of the blank cell generating circuit 1314, and a numeral 1315 denotes a blank cell inserting line. Of the parts mentioned above, the FIFO 1101 and the input control circuit 312 operate in the same manner as those in the preceding two embodiments. In the case of the instant embodiment, the output control circuit 313 serves to control the cell reading operation by sending the read clock to the FIFO 1101 and additionally insert the block cells in the output signal for transmission by controlling the blank cell generating circuit 1312 and the selector 1313.

Now, the structure as well as operation of the output control circuit 313 will be described in more detail. FIG. 25 is a block diagram showing a circuit configuration of the output control circuit 313. In this figure, a reference numeral 1317 denotes a delay circuit for generating a read enable signal $S_{16}$ by delaying one cell length the activation signal $S_{15}$ supplied from the input control circuit 312 one cell length by making use of the clock CK2 for system synchronization, wherein the read enable signal $S_{16}$ is sent out onto the read enable signal line 322. A numeral 1318 denotes a cell period counter for generating a cell period signal $S_{17}$ having pulses generated every cell period by counting the synchronizing system clock CK2 to send out the cell period signal $S_{17}$ onto the cell period signal line 1323. A numeral 1319 denotes a blank cell inserting counter which generates a blank cell inserting signal $S_{14}$ having the length coinciding with that of the information cell at such a period that the product of the number of the blank cell pulses as generated and the pulse width is equal to a sum of the overhead regions and the blank regions E within one frame, wherein the blank cell inserting signal $S_{14}$ is sent onto the blank cell inserting signal line 1316. A numeral 1220 denotes an edge trigger type flip-flop, 1321 denotes an AND gate, 1322 denotes a read enable signal line, 1323 denotes a cell period signal line, and a numeral 1324 denotes a reading clock control line. FIG. 26 is a time chart for illustrating operation of the output control circuit 313. The input information bit stream shown in FIG. 26 at (a) is same as in the case of the preceding two embodiments. FIG. 26 is to illustrate the operation of the output control circuit upon activation thereof. Upon inputting of the activation signal $S_{15}$, the read enable signal $S_{16}$ is generated with a delay corresponding to the length of one cell by the delay circuit 1317. Subsequently, in response to the cell period signal $S_{17}$ generated in succession to the read enable signal $S_{16}$, the edge trigger type flip-flop 1320 is set, the output $S_{18}$ of which controls the AND gate 1321 to allow the latter to supply the reading clock $S_{19}$ to the FIFO 1101 shown in FIG. 24 by way of the read control line 1309, whereon the cell reading operation is started. The blank cell inserting counter 1319 controls the AND gate 1321 by the blank cell inserting signal $S_{14}$ every one of the abovementioned periods to disenable the transmission of the reading clock $S_{19}$ therethrough, while controlling the blank cell generating circuit 1312 and the selector 1313 shown in FIG. 24 for sending out the blank cell onto the output line 1305. Additionally, the blank cell inserting signal $S_{14}$ is inputted to the cell period counter 1318, whereby operation of the cell period counter 1318 is stopped so long as the blank cell is inserted. In that case, the period of cell generation is elongated by the period during which the cell is inserted. Thus, because at least the length of one cell intervenes between the start of the cell writing and the start of the cell reading and because the blank cell is periodically inserted in the information bit stream there is one possibility that the cells stored in the FIFO 1101 are exhausted even if the writing of the cell is suspended upon arrival of the overhead for transmission at the input line. Thus, it is possible to read out the cells in succession except for the cell send-out period. In this manner, in the case of the instant embodiment, there is sent out on the output line 1305 of the cell phase synchronizing circuit the signal in which the overhead regions for transmission and the blank regions E on the input line 1304 are replaced enbloc by the blank cell, as can be seen in the output information bit stream shown in FIG. 26 at (b). In that case, the cells are synchronized in phase with the cell period signal $S_{17}$. Further, by selecting the cell length so as to equal the quotient resulting from division of the sum of the lengths of overhead region for transmission and the blank area E by an integer, making it possible to generate the blank cells regularly at a period equal to the frame period, the circuit configuration of the cell inserting counter 1319 can be much simplified.

When the cells are to be synchronized in phase for a plurality of the input line (lines) also in the case of the instant embodiment, this can be accomplished by using in common to the plural line (lines) the cell period counter 1318 and the blank cell inserting counter of the output control circuit 313.

According to the instant embodiment, the capacity of the FIFO 1101 for storing the cells is 3 M bytes in total, M bytes for absorbing the variation in the phase brought about by the overhead for transmission, M bytes for phase matching on a cell basis, and M bytes for the increase in the amount of cell storage upon insertion of the blank cells. This capacity is apparently far smaller than that required for realizing the frame synchronization which is given by (L+0) P byte (frame length). Accordingly the cell phase synchronization can be accomplished by employing FIFO (buffer memory) of a small capacity. Besides, because of short time taken for storing the cells in the FIFO, delay involved by the phase synchronization can be correspondingly reduced. It should further be added that the frequency conversion circuit 1121 shown in FIG. 19 can be spared according to the instant embodiment. Additionally, it is possible to transmit signals for transmission control and other purpose by making use of the blank cells inserted in the output information stream.

We claim:

1. An ATM (Asynchronous Transfer Mode) switching system, comprising:
   a plurality of ATM line terminating apparatus each provided for each of a plurality of lines, respectively, each ATM line terminating apparatus including:
   (a) line terminating means for accommodating a transmission line to perform (i) extraction of a clock signal and detection of a frame from an input signal coming in the form of cells, each of a fixed length, and (ii) phase synchronization on a bit basis,
   (b) cell phase synchronizing means connected to the output of said line terminating means for detecting the phase of the cells inputted with phases differing from one to another line and for synchronizing said cells of said lines with respect to the phase thereof,
   (c) header detecting means connected to the output of said cell phase synchronizing means for reading a header contained as a part of the cell,
   (d) storage means for storing header information read out by said header detecting means,
   (e) flow monitor means for monitoring flows of cells on said lines on the basis of the header information stored in said storage means, and
   (f) header conversion means connected to the output of said header detection means, the output of said storage means and the output of said flow monitoring means for changing the header of the cell on the basis of the outputs of said header detection means, said storage means and said flow monitoring means;
   a signal processing circuit provided in common to said lines for processing a call control signal on a line basis;
   a control circuit provided in common to said lines and interconnected with said signal processing circuit for controlling the processing of calls on a line basis in accordance with call control information supplied from said signal processing circuit; and
   a self-routing type switch connected to each of said ATM line terminating apparatus for switching the cell coming from a given one of said ATM line terminating apparatus to another ATM line terminating apparatus in accordance with the header information contained in said cells.

2. An ATM switching system according to claim 1, wherein said flow monitor means includes:
   means for detecting an excess of the cell flow; and
   means for generating a flow control signal indicating a processing of scrapping or marking the cells in accordance with the results of the detection of said detecting means;
   said header conversion means responding to the input of said flow control signal for thereby scrapping said cells or imparting marks to the headers of said cells.

3. An ATM (Asynchronous Transfer Mode) type high-speed cell switching system for transmitting communication information by using cells each having a header containing control information, such as a call identification number, and an information field containing user information, comprising:

ATM line terminating apparatuses provided in correspondence with individual lines, respectively, and each ATM line terminating apparatus including:
(a) electrical/physical terminating means of input-/output lines,
(b) cell delimiting means for delimiting said cells,
(c) cell synchronizing means for matching mutual phases of the cells on the lines in a predetermined relation on a cell basis,
(d) switch control means for storing switch control information prescribing switching operation of each cell, and
(e) cell flow control means for controlling cell flow from each input line;

a self-routing type switch circuit connected to each ATM line terminating apparatus and including cell switching means for switching the cells from a given one of said ATM line terminating apparatuses to another given one in accordance with the control information of the header of each cell inputted from said ATM line terminating apparatuses; and at least one signal processing circuit provided in common to the lines and connected to said switch circuit, said signal processing circuit including means for terminating call control signals such as intra-system or inter-user call setting or call release or the like signal transferred by making use of said cells.

4. An ATM (Asynchronous Transfer Mode) speech path system for exchanging communication information by using cells each of a fixed length, wherein each of said cells includes a header containing a call identification number and other control, information and an information field containing said communication information, comprising:

means for deriving information required for a switching operation by retrieving an information table on the basis of said header information;

cell rate conversion means provided in correspondence with lines, respectively, for synchronizing phases of the cells on said lines and at the same time performing a rate conversion of said cells; and a self-routing switch constituted only by hardware for serving as a switch for routing the cells from an incoming line to an outgoing line.

5. In an ATM (Asynchronous Transfer Mode) switching system including a self-routing switch for performing a switching operation by using cells carrying communication information as units, an ATM line terminating apparatus serving as an interface between a transmission line and said self-routing switch, comprising:

a line terminating circuit for matching of an electrical condition and a communication rate between the transmission line and a plurality of intra-system lines;

a cell phase synchronizing circuit for matching phases of the cells in an information stream (bit row) outputted from said line terminating circuit to the intra-system on each of plural lines accommodated in said ATM switching system on a cell basis;

a detection circuit for reading out a header existing in said cell and containing a call identification number;

an information table for storing switching information and flow information for every call identification number;

a flow monitor circuit for measuring the flow in correspondence with each of the call identification numbers to thereby detect an excess in the flow relative to a prescribed value determined previously in precedence to the call setting; and a header conversion circuit for adding header routing information to each cell and/or changing the call identifier number.

6. An ATM switching system according to claim 5, wherein said flow monitor circuit comprises:

a count memory for counting arriving cells and storing a counted value for every call identification number;

a time memory for storing a time at which measurement is started;

a timer for outputting current time;

a first comparator for comparing the result of the count memory with a predetermined constant number for every call identification number, the result of the comparison being utilized as a flow control signal;

a subtracter for calculating a difference between the current time outputted from said timer and the measurement start time stored in said timer memory to thereby determine the measurement time taken for the measurement;

a time setting memory for storing time preset for each call identification number; and a second comparator for comparing the measurement time calculated by said subtracter with the preset value stored in said time setting memory to thereby reset the count value in said count memory and replace the value of said timer memory by the current time when said measurement time exceeds said preset value.

7. An ATM switching system according to claim 5, wherein said information table stores the contents of said count memory, said timer memory and said preset time memory, switching control information such as header information and the flow control information with the call identifier numbers being used as addresses.

8. An ATM switching system according to claim 5, wherein said flow monitor circuit comprises:

a count memory for counting arriving cells and storing a counted value for each of the cell identification numbers;

a timer memory for storing a time at which measurement is started;

a timer for outputting current time;

a present number memory for storing a preset number of cell arrivals for each of the call identification numbers;

a first comparator for comparing a result of said count memory with the preset number of said preset number memory for each of the call identification numbers;

a subtracter for calculating a difference between a current time outputted from said timer and a measurement start time stored in said timer memory to thereby determine measurement time taken for the measurement; and a second comparator for comparing the measurement time calculated by said subtracter with a preset time to thereby reset the count value of said count memory and replace the value of said timer memory by the current time when said measurement time exceeds said preset time.

9. An ATM switching system according to claim 8, wherein said information table stores the contents of said count memory, said timer memory and said preset number memory, switching control information such as header information and the flow control information with the call identifier numbers being used as addresses.

10. An ATM switching system according to claim 5, wherein said header conversion circuit comprises:
   a selector circuit for selecting either the output of said cell phase synchronizing circuit or the outputs of said information table and said flow monitor circuit;
   an insert circuit for inserting the output of said selector circuit in the header of the cell at a predetermined position; and
   a switching control circuit for outputting a select signal generated in synchronism with a system clock on the basis of a phase common to the individual lines for thereby allowing said insert circuit to insert either the call identifier number and the routing information outputted from said cell phase synchronizing circuit or the flow excess information outputted from said flow monitor circuit in the header of the cell at the predetermined position.

11. An ATM (Asynchronous Transfer Mode) switching system according to claim 5, wherein said cell phase synchronizing circuit comprises:
   cell phase detecting means for detecting positions of cells in said information streams (information bit row) on said intra-system lines;
   a cell synchronizing buffer connected to an incoming line by way of an isolating circuit and to an outgoing line by way of a selector circuit and including a plurality of buffer memories each having a capacity corresponding to at least one cell;
   a write control circuit for extracting a cell from the input information stream, selecting sequentially one of said plurality of buffer memories constituting said synchronizing buffer and writing the cells in said buffer one by one in the order of arrival;
   register means for indicating the written states of said plurality of the buffer memories; and
   a read control circuit for controlling said selector circuit on the basis of information in said register means to select the buffer memory to be next read out from the buffer memories storing the cells for thereby performing read control with a phase generated in synchronism with a system clock in common to all lines.

12. An ATM switching system according to claim 11, wherein upon reading the cells from said cell synchronizing buffer, said read control circuit reads out said cells at rate and frequency differing from those employed at the time of writing the cells to thereby allow said cell phase synchronizing circuit to output only the cells or cells and a blank field having a length corresponding to an integral multiple of that of the cell.

13. An ATM switching system according to claim 11, wherein upon reading the cells from said cell synchronizing buffer, said read control circuit adds to the cells a blank field in which switching control information or the like can be placed.

14. An ATM (Asynchronous Transfer Mode) switching system according to claim 5, wherein said cell phase synchronizing circuit comprises:
   buffer memories for storing the cells;
   an input control circuit for controlling the writing of the cells of said payload field into said buffer memories; and
   an output control circuit for reading out the cells from said buffer memories while synchronizing said cells with respect to phase.

15. An ATM switching system according to claim 14, wherein upon reading the cells from said buffer memories, said cells are read out at a rate sufficient for transmitting all the cells in said payload field.

16. An ATM switching system according to claim 14, wherein said output control circuit includes means for periodically inserting a predetermined bit pattern during reading the cells from said buffer memories, so that said cells are read out at the same rate as the transmission rate on the input line.

17. An ATM switching system according to claim 16, wherein said predetermined bit pattern is inserted at the same period and with the same length as those of the overhead field for transmission and as those of the region of said payload field where no cells are present, to thereby allow said cells to be read out from said buffer memories at the same rate as the transmission rate on the input line.

18. An ATM switching system according to claim 14, wherein the length of the cell is selected to be equal to a quotient resulting from division by an integer of a sum of the length of the overhead field and that of the region of said payload field where no cells are present within the insertion period having a duration equal to an integral multiple of the overhead period, and including means for inserting blank cells upon reading of said cells from said buffer memory to thereby allow the cell reading to be effected at the same rate as the transmission rate on the input line.

* * * * *